United States Patent
Jay et al.

(10) Patent No.: US 9,984,383 B2
(45) Date of Patent: May 29, 2018

(54) WIRELESS TAG COMMUNICATION APPLICATIONS FOR A VENUE

(71) Applicant: RIPPLE RESORT MEDIA, LLC, Aspen, CO (US)

(72) Inventors: Matthew Jay, Aspen, CO (US); Laurence Wade Knall, Aspen, CO (US)

(73) Assignee: RIPPLE RESORT MEDIA, LLC, Aspen, CO (US)

( * ) Notice: Subject to any disclaimer, the term of this patent is extended or adjusted under 35 U.S.C. 154(b) by 405 days.

(21) Appl. No.: 13/659,761

(22) Filed: Oct. 24, 2012

(65) Prior Publication Data

US 2013/0102248 A1    Apr. 25, 2013

Related U.S. Application Data

(60) Provisional application No. 61/550,705, filed on Oct. 24, 2011.

(51) Int. Cl.
  *H04B 5/00* (2006.01)
  *H04B 7/00* (2006.01)
  (Continued)

(52) U.S. Cl.
  CPC ... *G06Q 30/0241* (2013.01); *G06F 17/30879* (2013.01); *H04L 67/02* (2013.01);
  (Continued)

(58) Field of Classification Search
  CPC ...... H04B 5/0062; H04B 5/0068; H04B 5/02; G06K 7/10237; G06K 7/10198;
  (Continued)

(56) References Cited

U.S. PATENT DOCUMENTS 5,685,095 A * 11/1997 DeMasi .................... G09F 3/20
                                                     297/488
5,694,514 A * 12/1997 Evans et al. ................. 386/240
(Continued)

FOREIGN PATENT DOCUMENTS

EP         1914631 A1      12/2016
JP       2003-167896        6/2003
(Continued)

OTHER PUBLICATIONS

European Patent Application 12843362.0 European Search Report dated Feb. 10, 2015, 8 pages.
(Continued)

*Primary Examiner* — Yuwen Pan
*Assistant Examiner* — Paul P Tran
(74) *Attorney, Agent, or Firm* — Lathrop Gage LLP

(57) ABSTRACT

A system for delivering information to a venue guest includes a wireless tag within the venue and having a Universal Resource Locator (URL) stored therein, and a server for providing the information through a web page addressable by the URL. The web page displays the information to any portable media device that interfaces with the wireless tag. A system for delivering location specific information of a venue to a guest at the venue includes a venue app that contains the information and downloadable, machine readable, instructions that are compatible with a portable media device, and a wireless tag having a location indicator is associated with a location of the tag within the venue. If the venue app is executed by the portable media device, and receives the location indicator from the wireless tag, the venue app displays the information, based upon the location indicator, on the portable media device.

18 Claims, 13 Drawing Sheets

(51) Int. Cl.

| | |
|---|---|
| H04M 1/66 | (2006.01) |
| H04M 1/68 | (2006.01) |
| H04M 3/16 | (2006.01) |
| H04M 3/493 | (2006.01) |
| H04W 24/00 | (2009.01) |
| H04Q 5/22 | (2006.01) |
| G08B 13/14 | (2006.01) |
| H04N 7/18 | (2006.01) |
| H04N 5/76 | (2006.01) |
| G01R 31/08 | (2006.01) |
| G01F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| G07G 1/12 | (2006.01) |
| G06F 15/16 | (2006.01) |
| G06Q 30/02 | (2012.01) |
| H04W 4/04 | (2009.01) |
| G06F 17/30 | (2006.01) |
| H04W 4/00 | (2018.01) |
| H04W 4/20 | (2018.01) |
| H04L 29/08 | (2006.01) |

(52) U.S. Cl.
CPC .............. *H04W 4/04* (2013.01); *H04L 67/34* (2013.01); *H04W 4/008* (2013.01); *H04W 4/206* (2013.01)

(58) Field of Classification Search
CPC ........... G06K 7/10297; G06K 7/10386; G06Q 20/20; G06Q 20/32; G06Q 20/327; G06Q 20/3224; G06Q 20/3278; G06Q 20/352; G06Q 30/0241; G06Q 30/0269; G06Q 30/06; G06Q 20/28; G06Q 20/29; G06Q 20/353; G06Q 30/20; G06Q 30/32; G06Q 30/352; G06Q 30/02; H04M 1/7253; H04M 1/72572; H04M 2250/04; H04M 2250/12; H04M 17/00; H04M 17/20; H04L 67/02; H04L 63/0492; H04L 63/0853; H04L 67/04; H04L 67/14; H04L 67/28; H04L 12/06; H04L 12/2809; H04L 12/282; H04L 29/12113; H04L 63/00; H04W 4/00; H04W 4/001; H04W 4/008; H04W 4/021; H04W 84/18; H04W 88/06; H04W 88/00; G09F 3/16; G09F 3/20; G09F 21/02; G09F 23/02; B61B 7/00; B61B 12/002; B65G 67/22; B65G 69/00; B65G 69/02; B65G 69/20; G06F 21/35; G06F 21/79; H04N 1/00137; H04N 1/00151; H04N 1/00188; H04N 1/2179; H04N 1/2187
USPC ........ 455/41.1, 41.2, 404.1, 411, 414.2, 418, 455/456.1, 457; 235/375, 380, 383, 451; 340/10.1, 10.4, 25, 72.1; 348/143, 231.2; 370/252; 463/7; 705/26.1, 26.41; 709/227
See application file for complete search history.

(56) References Cited

U.S. PATENT DOCUMENTS

| | | | | |
|---|---|---|---|---|
| 5,743,449 | A * | 4/1998 | McBride ................ | A63C 11/00 224/191 |
| 6,275,153 | B1 * | 8/2001 | Brooks ................. | A63C 11/003 340/568.6 |
| 8,669,845 | B1 * | 3/2014 | Chakraborty .......... | G06Q 50/00 235/440 |
| 9,055,101 | B2 * | 6/2015 | Kasslin et al. | |
| 9,208,293 | B1 * | 12/2015 | Zhu ........................ | G06F 21/35 |
| 2004/0201738 | A1 * | 10/2004 | Moores et al. ........... | 348/231.2 |
| 2004/0230656 | A1 | 11/2004 | Sugawara | |
| 2008/0046570 | A1 * | 2/2008 | Abel ............................ | 709/227 |
| 2009/0291726 | A1 * | 11/2009 | Svensson .......................... | 463/7 |
| 2010/0184372 | A1 | 7/2010 | Tabaaloute | |
| 2011/0001606 | A1 * | 1/2011 | Charych ............. | G07C 9/00111 340/5.7 |
| 2011/0053559 | A1 * | 3/2011 | Klein ........................... | 455/411 |
| 2011/0165859 | A1 | 7/2011 | Wengrovitz | |
| 2011/0202417 | A1 * | 8/2011 | DeWakar ............. | G06Q 20/102 705/21 |
| 2011/0277658 | A1 * | 11/2011 | Ahrens ................. | B61B 12/002 104/89 |
| 2012/0044059 | A1 * | 2/2012 | Saros ...................... | H04W 4/02 340/10.5 |
| 2012/0187184 | A1 * | 7/2012 | Challa et al. ................. | 235/375 |
| 2012/0253974 | A1 * | 10/2012 | Haikonen et al. ......... | 705/26.41 |

FOREIGN PATENT DOCUMENTS

| | | |
|---|---|---|
| JP | 2004-171486 | 6/2004 |
| JP | 2004171486 A | 6/2004 |
| JP | 2005-158050 | 6/2005 |
| JP | 2005158050 A | 6/2005 |
| JP | 3127257 U | 11/2006 |
| JP | 2008-165736 | 7/2008 |
| JP | 2008165736 A | 7/2008 |
| JP | 3149593 U | 4/2009 |

OTHER PUBLICATIONS

"NFC Forum Type Tags—White Paper V1.0," Apr. 1, 2009, pp. 1-24, XP055044165, Retrieved from the Internet: URL: http://www.nfc-forum.org/resources/white_papers/NXP_BV_Type_Tags_White_Paper-Apr09.pdf, retrieved on Nov. 14, 2012.

Taoufix, Ghanname, "How NFC Can to Speed Bluetooth Transactions-Today," Internet Citation, Feb. 14, 2006, XP02458023, Retrieved from the Internet: URL:http://www.wirelessnetdesignline.com/showArticle.jhtml?articleID=180203270, retrieved on Nov. 8, 2007.

Australian Patent Application 2012328871 Patent Examination Report, dated Mar. 10, 2015, 4 pages.

International Search Report and Written Opinion issued in PCT Application PCT/US12/61730, dated Jan. 8, 2013, 17 pages.

Australian Patent Application No. 2012328871; Patent Examination Report No. 2 dated Feb. 19, 2016—4 pages.

Japanese Patent Application No. 2014-538956, Notice of Reasons for Rejection dated Dec. 19, 2016, dated Dec. 22, 2016.

Australian Patent Application No. 2016201539, Examination Report dated Dec. 8, 2016, 4 pgs.

European Patent Application No. 12843362.0, Communication pursuant to Article 94(3) EPC dated Mar. 6, 2017—5 pages.

Iwanaga et al., "A Guidance and Instruction Information System to improve customer satisfaction in the Large-scale resort type skiing area," National Conference of the JASMIN 2008 Spring, Program Collection, Conference theme "IT and area coexistence" [CD-ROM], Japan, Japan Society for Management Information, Jun. 7, 2008, 4 pp.

Japanese Patent Application No. 2014-538956, English translation of Office Action dated Dec. 15, 2017, 12 pages.

* cited by examiner

Figure# WIRELESS TAG COMMUNICATION APPLICATIONS FOR A VENUE

RELATED APPLICATIONS

This application claims priority to U.S. Patent Application Ser. No. 61/550,705, titled "Near-Field Communication Applications For A Resort", filed Oct. 24, 2011, and incorporated herein by reference.

BACKGROUND

Near field communication (NFC) tags are readable by a wireless reader in close proximity (touching—8 inches). NFC tags may be incorporated into products and displays for communicating with portable readers. NFC readers are being included within portable communication devices (e.g., portable media devices and cellular phones) and are thereby becoming more common place and more widely used. Bluetooth also offers short range wireless communication and is already included in many portable devices.

SUMMARY

In an embodiment, a system for delivering information to a guest at a venue includes a wireless tag located within the venue and having a Universal Resource Locator (URL) stored therein, and a server for providing a web page addressable by the URL and containing the information. The web page displays the information to any portable media device, used by the guest, that interfaces with the wireless tag.

In an embodiment, a system for delivering location specific information of a venue to a guest at the venue includes a venue app that contains the information and comprises downloadable, machine readable, instructions that are compatible with a portable media device of the guest, and a wireless tag located within the venue and having a location indicator that is associated with a location of the tag within the venue. If the venue app is downloaded to and executed by the portable media device, and receives the location indicator from the wireless tag, the venue app displays the information, based upon the location indicator, on the portable media device.

In an embodiment, a method for delivering information to a guest at a venue includes configuring a web page with the information, wherein the web page is addressable by a Universal Resource Locator (URL) stored within a wireless tag, receiving an access request to the URL from a portable media device of the guest when the portable media device interfaces with the wireless tag, and delivering the information to the guest by sending the web page to the portable media device.

In an embodiment, a method for delivering contact information of an interested party to an advertiser includes displaying an advertisement of the advertiser at a location accessible by the interested party and with a wireless tag programmed with a Universal Resource Locator (URL), and configuring a web page addressable by the URL with a script for receiving the contact information. The method also includes receiving an access request to the URL from a portable media device that interfaces with the wireless tag, receiving, using the script, the contact information from the portable media device, and sending the contact information to the advertiser in exchange for revenue.

In an embodiment, a system for delivering location specific information of a venue to a guest at the venue includes a venue app, containing the location specific information, available for download to a portable media device of the guest, and comprising machine readable instructions executable by a processor of the portable media device, and a wireless tag having a location indicator associated with a location of the tag within the venue. If the portable media device downloads and executes the venue app to receive the location indicator from the tag, the venue app displays, based upon the location indicator, the location specific information on the portable media device.

In an embodiment, a method for delivering information to a guest at a venue includes configuring a web page that is addressable by a Universal Resource Locator (URL) stored within a wireless tag, with the information, receiving an access request to the URL from a portable media device that has read the URL from the tag, and sending the web page to the portable media device for delivery to the guest.

In an embodiment, a method for providing a venue with wireless tag based communication capability includes configuring a plurality of wireless tags with digital content that is specific to the venue, wherein each of the wireless tags is capable of transmitting the digital content to a portable media device, and installing the wireless tags at the venue.

In an embodiment, a method for providing information services to guests of a venue that has wireless tags installed therein includes configuring a server with information that corresponds to digital content stored on one or more of the wireless tags, and upon receiving a request from a portable media device that receives the digital content from one of the wireless tags, downloading the information to the portable media device.

In an embodiment, a method for a venue operator to enhance customer experience of guests at a venue includes providing information of the venue to a media provider, and granting the media provider access to the venue to install wireless tags with a physical display of the information within the venue, the wireless tags storing digital content that the guests can access through a portable media device to display further information.

DETAILED DESCRIPTION OF THE EMBODIMENTS

Figure 1:
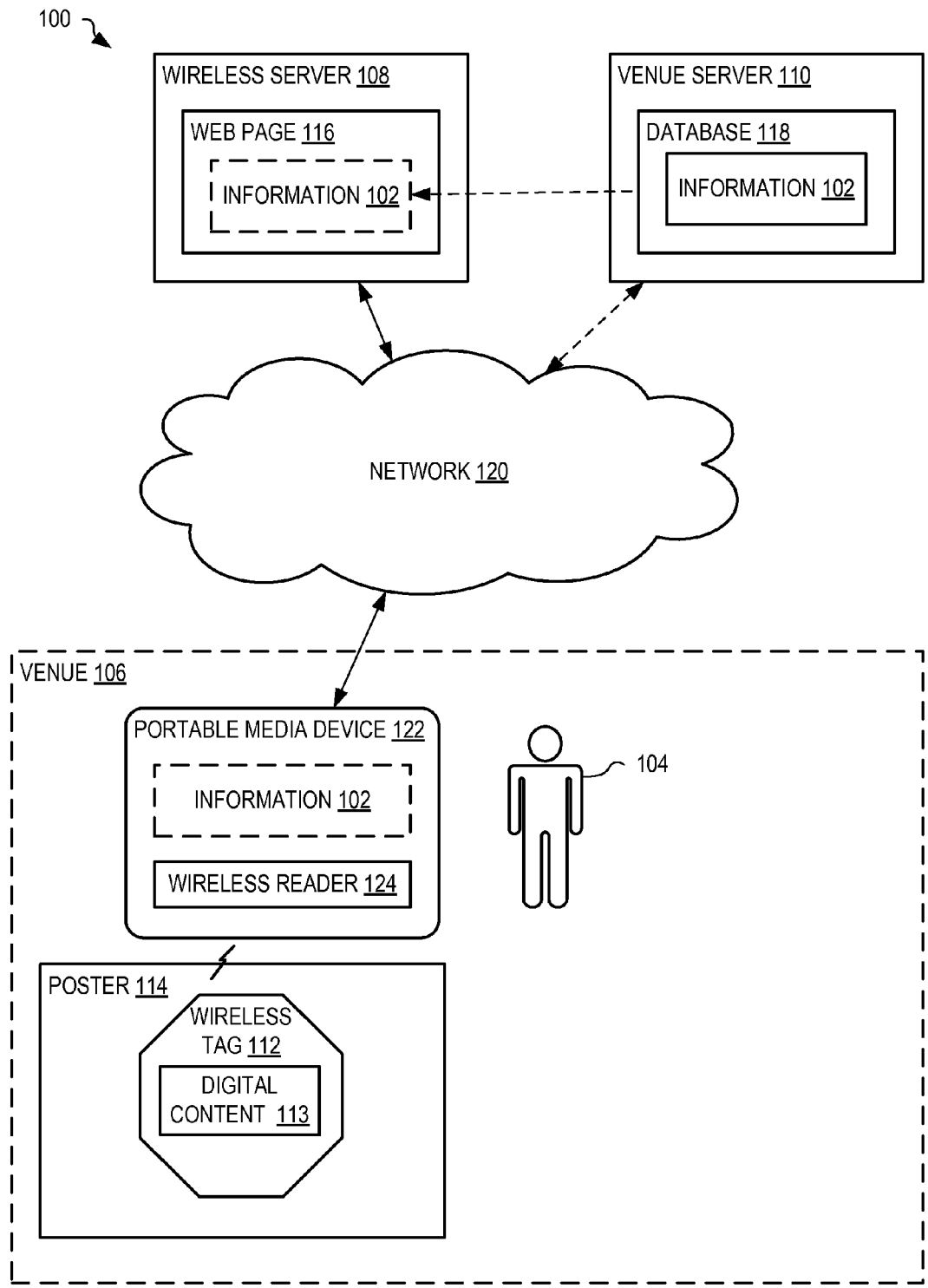
FIG. 1 shows one exemplary wireless system for delivering information to a guest at a venue, in an embodiment.

In the following embodiments, the described portable media devices may represent a smart phone (e.g., Blackberry® Torch, Nokia® 700, Samsung® S5230, that include near-field communication (NFC) tag reading capability, APPLE® IPHONE® that includes Bluetooth 4.0 and/or NFC tag reading capabilities, and so on) or any other mobile device equipped with short range wireless communication capability and optionally with network (e.g., Internet) communication capability.

As used herein, a "wireless tag" means any of an NFC tag, an RFID tag, a Bluetooth device or other device that can be integrated with other objects and can interface wirelessly with a portable media device. Also, as used herein, for a portable media device to "interface" with a wireless tag means that when such device and tag are brought into proximity with one another, at least one of the device and the tag wirelessly transmits information to the other. In one embodiment, a portable media device emits a short range radio signal, from which an NFC tag collects power and responds by emitting a response signal containing digital information that is received by the portable media device. In another embodiment, a Bluetooth tag detects a short range radio signal emitted by a portable media device and responds by sending a response signal containing digital information that is received by the portable media device.

In the following examples and embodiments, servers may represent one or more computers that include a memory, a processor, and that have network capability.

As used herein, a "venue" is any building or indoor or outdoor facility that is generally operated by an operator of the venue on a public or private basis, and to which guests may come for entertainment, shopping, transportation and/or recreational purposes. Examples of a venue include but are not limited to stadiums, arenas, ballparks, theaters, amphitheaters, parks, recreational areas, gymnasiums, arcades, ice rinks, bowling alleys, stores, shopping centers, airports, train stations, bus terminals, truck stops, marinas, restaurants, resorts, amusement parks and ski resorts. Also, as used herein, a "guest" at a venue is used to mean any person at the venue, e.g., "guests" include but are not limited to paying or nonpaying customers, employees, owners, managers, contract workers, concessionaires, maintenance workers, drivers, pilots and so forth.

As used herein, an "app" is a software product that includes instructions, that is downloaded (installed) onto a portable media device and executed by a processor thereof to provide functionality specific to a particular venue and/or functionality specific to wireless tags. For example, APPLE® provides an app store from where apps may be downloaded to, installed on, and executed on an IPHONE®. Apps may be developed and made available for download by entities described herein, such as advertiser 1302, venue operator 1304, IT provider 1308 and/or media provider 1310 (see FIG. 13), or may be publicly available from other sources. Typically, a portable media device includes memory into which an app may be downloaded, and a processor that executes the app. The memory can for example be nonvolatile (e.g., nontransitory) memory.

FIG. 1 shows one exemplary wireless system 100 for delivering information 102 to a guest 104 at a venue 106. Information 102 may include information pertaining to the venue 106. System 100 includes a wireless server 108, a venue server 110, and a wireless tag 112. Wireless server 108 is connected to, and accessible via, a network 120. Network 120 is for example one or more of a local area network, a wide area network, and the Internet. Optionally, venue server 110 may also connect to the network 120, or may be in direct communication (e.g., connected on a local network) with wireless server 108. In one embodiment, functionality of wireless server 108 and venue server 110 are co-located and/or combined into a single server. Information 102 may be stored within a database 118 of venue server 110, for example.

Wireless tag 112 is positioned within venue 106 and accessible by guest 104. For example, tag 112 is positioned on a poster 114 to make it visible to guest 104. Poster 114 may display information of the venue, instructions for using tag 112, or other information, and may indicate the presence and location of tag 112 to guest 104. Wireless tag 112 may be positioned elsewhere within venue 106, such as on a large format signage, on a bar or on trays at a venue restaurant, on tables at the venue, on the cups used for drinking at the venue, on the lift ticket, on promotional material handed out at the venue, on ski racks, on skis rented at venue, and on room keys at the venue.

Wireless tag 112 includes digital content 113 stored therein, and wireless tag 112 transmits transmit digital content 113 upon access by guest 104 as discussed below. In an embodiment, digital content 113 includes a Universal Resource Locator (URL), a character string that specifies where a known resource is available on a network (e.g., the Internet) and the mechanism for retrieving it. In such an embodiment, tag 112 includes at least one URL (e.g., within digital content 113) that identifies a web page 116 hosted by wireless server 108. Wireless server 108 communicates with venue server 110, via network 120 for example, to retrieve information 102 from database 118 for inclusion within web page 116. In other embodiments, digital content 113 may include digital video, audio, text and/or image information, parameters for applications that may be utilized by guest 104, and/or information that includes a location identifier (e.g., see location ID 815, FIG. 8) of wireless tag 112, instead of or in addition to a URL, as described below. In embodiments, digital content 113 may include or link to (e.g., through a URL) information specific to the venue, information related to an advertiser, public service information, or any combination of such information, as discussed below. One such combination of information is a link to a web page that includes knowledge of a location identifier, that is, a URL that accesses a web page wherein when the web page opens on the portable media device, it is customized with information of a specific location identifier.

Guest 104 has a portable media device 122 that may have network capability (e.g., a mobile phone or tablet device that cooperates with a wireless Internet connection and/or a cell phone carrier) and includes a wireless reader 124 for reading tag 112 when in close proximity (e.g., within about 8 inches)

thereto. In one example of operation, guest 104 places device 122 in close proximity to tag 112, whereupon device 122 automatically reads a URL as digital content 113 from wireless tag 112, connects to web page 116, and receives information 102. In other examples of operation, when guest 104 places device 122 in close proximity to tag 112, device 122 automatically reads digital video, audio, text and/or image information as digital content 113 from tag 112, and displays corresponding video, audio, text and/or images through device 122. In yet another example of operation, when guest 104 places device 122 in close proximity to tag 112, device 122 automatically reads parameters that may be utilized by applications running on device 122, as digital content 113 from tag 112.

Wireless tag 112 may be attached to static items, such as displays, or may be attached to mobility devices for moving people within the venue. In one example, where venue 106 is a ski resort, tag 112 is mounted on a chair of a ski lift at the resort and poster 114 represents one or more of a map, an advertisement, and resort information displayed on a restraining bar of the chair. In another example, where venue 106 is a ski resort, tag 112 is mounted within a cabin of a gondola lift or shuttle bus at the resort and poster 114 represents one or more of a map, an advertisement, and resort information displayed within the cabin. In another example, where venue 106 is an amusement park and the mobility device is a ride, tag 112 is mounted within reach of guest 104 while seated in the ride. In another example, venue 106 represents a sports stadium and tag 112 is mounted within reach of guest 104 while seated in the stadium. When tag 112 is mounted on a mobility device or within reach of a specific seat at a venue, digital content 113 may include a location indicator associated with a specific location of tag 112. For example, chairs of ski lifts are often numbered, whereupon a tag associated with a specific chair may include a location indicator that identifies the chair by ski lift and by number of the chair. In another example, digital content 113 may include a location indicator associated with a section, row and seat number.

In one embodiment, information 102 is one or more of: slope grooming information, ski lift openings and closures, ski lift wait times, weather information, restaurant information, special promotions, specific coupons, event information, venue calendar, instructional messages, invitation to complete survey, link to venue app download, lift ticket purchase, terrain opening and closure, subscription to venue electronic mail ("email") or text communications, and registration to enter a promotion.

In one embodiment, functionality of wireless server 108, poster 114 and wireless tag 112 of system 100 is provided as a service to venue 106 in exchange for revenue. Venue 106 provides server 110 and information 102 to wireless server 108 together with information for display on poster 114. In one example, poster 114 and wireless tag 112 are provided for a first fee and each access to web page 116 resulting from device 122 reading tag 112 accrues a second fee.

Figure 2:
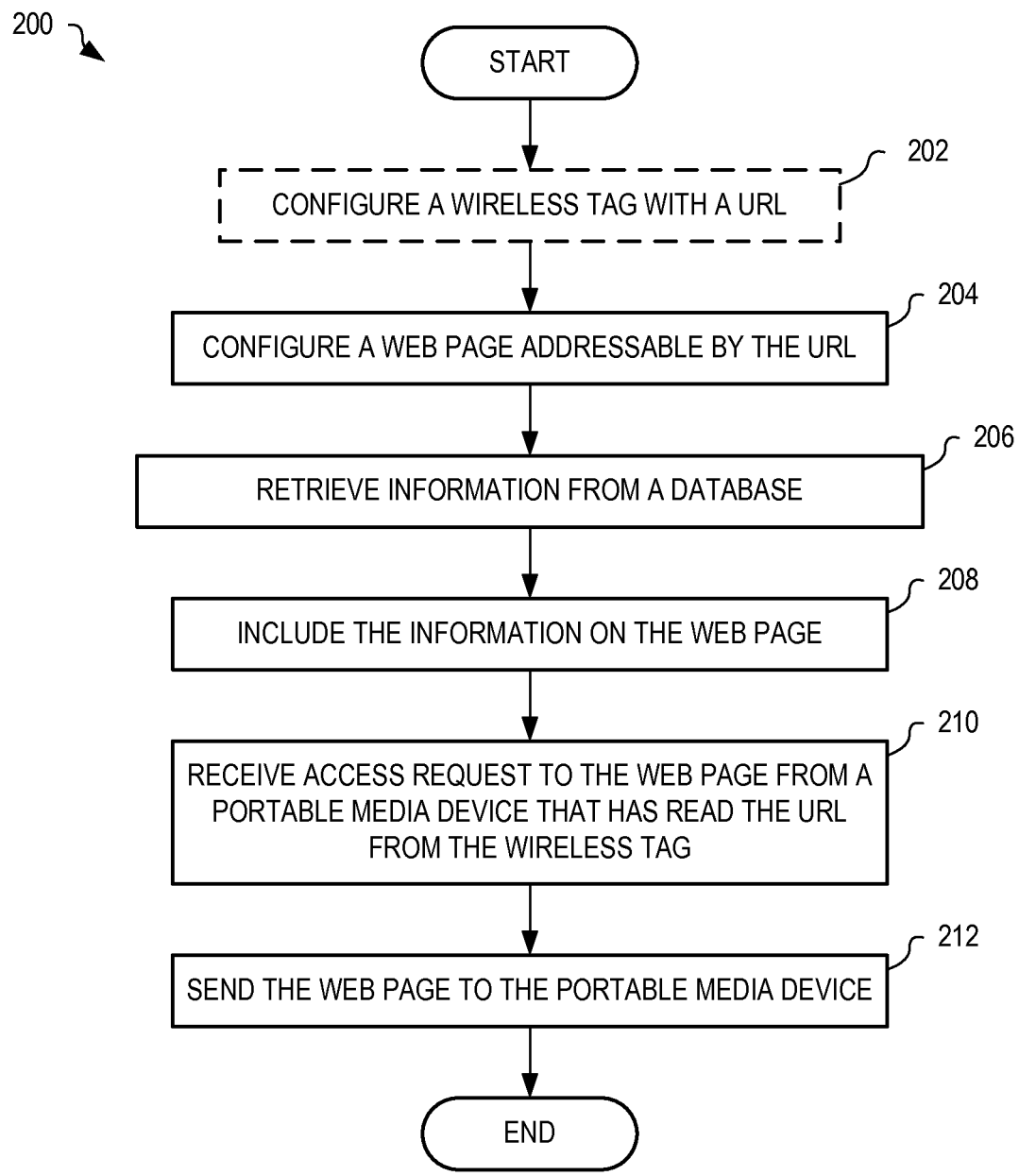
FIG. 2 is a flowchart illustrating one exemplary method for delivering information to a guest at a venue, in an embodiment.

FIG. 2 is a flowchart illustrating one exemplary method 200 for delivering information 102 to a guest 104 at a venue 106. Method 200 is for example implemented at least in part within wireless server 108 of system 100.

Step 202 is optional. If included in step 202, method 200 configures a wireless tag with a URL as digital content 113. In one example of step 202, wireless tag 112 is programmed using a wireless tag writer to store the URL as digital content 113. In step 204, method 200 configures a web page addressable by the URL. In one example of step 204, wireless server 108 configures web page 116 to be addressable by the URL.

In step 206, method 200 retrieves information. In one example of step 206, wireless server 108 retrieves information 102 from database 118 of venue server 110. In step 208, method 200 includes the venue information on the web page. In one example of step 208, wireless server 108 includes information 102 on web page 116. In step 210, method 200 receives an access request to the web page from a portable media device that has read the URL from the wireless tag. In one example of step 210, wireless server 108 receives an access request to web page 116 from portable media device 122 when portable media device 122 reads the URL as digital content 113 from tag 112. In step 212, method 200 sends the web page to the portable media device. In one example of step 210, wireless server 108 sends web page 116 to portable media device 122.

Steps 210 and 212 repeat for each access request received. Further, steps 206 and 208 may repeat periodically or whenever information 102 is changed. In one embodiment, wireless server 108 updates web page 116 based upon report information 102 of report server 110. The order of steps within method 200 may change without departing from the scope hereof. For example, step 202 may occur after step 204.

Figure 3:
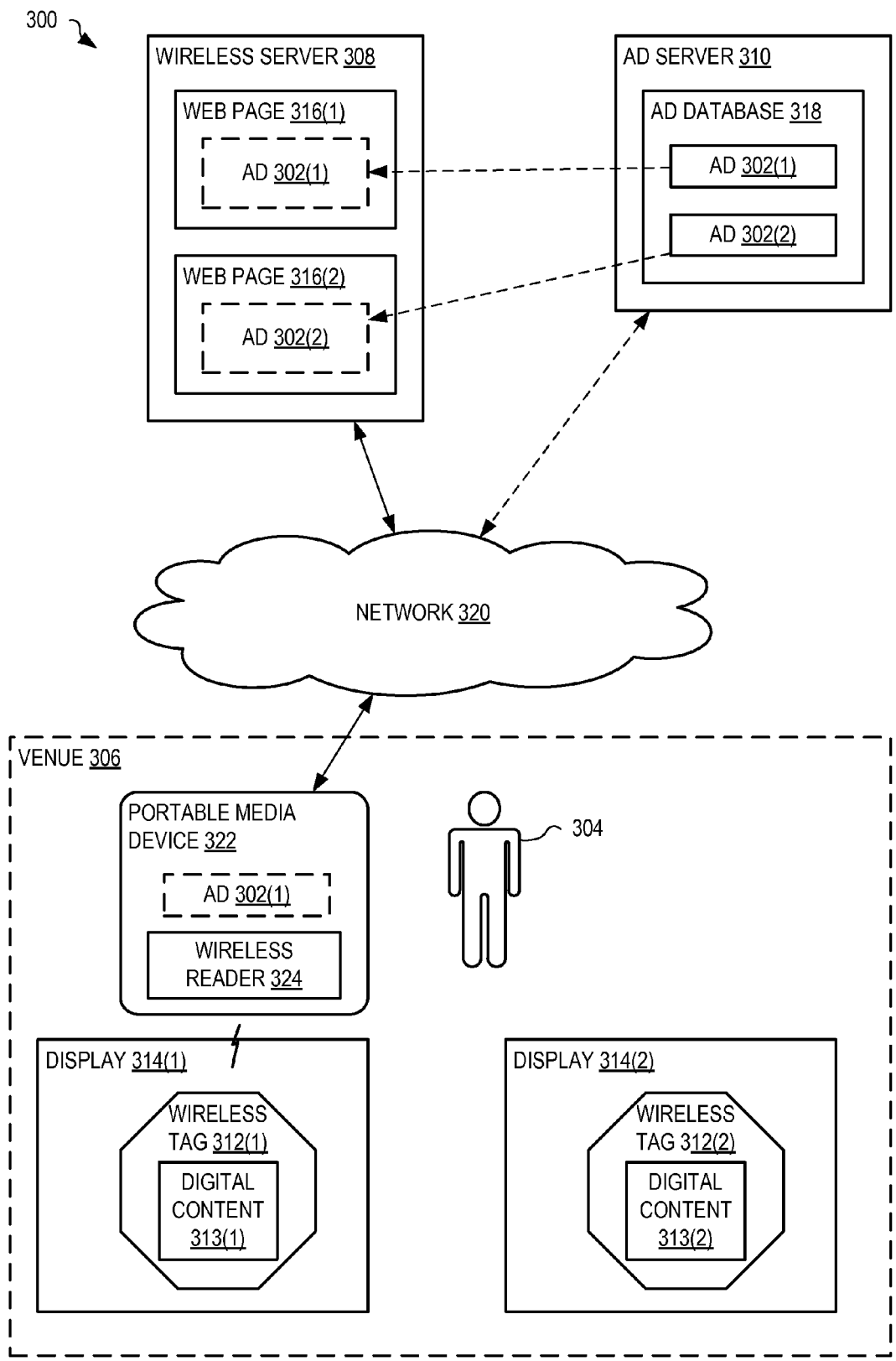
FIG. 3 shows one exemplary wireless system for delivering advertisements (ads) to a guest at a venue, in an embodiment.

FIG. 3 shows one exemplary wireless system 300 for delivering advertisements (ads) 302 to a guest 304 at a venue 306. System 300 includes at least one wireless tag 312 and a wireless server 308 in communication with an advertisement (ad) server 310. Wireless server 308 is connected to, and accessible via, a network 320. Network 320 is for example one or more of a local area network, a wide area network, and the Internet. Ad server 310 connects to network 320 to communicate with wireless server 308. In one embodiment, functionality of wireless server 308 and ad server 310 are co-located and/or combined into a single server. Ads 302 may be stored within an ad database 318 within ad server 310, for example.

Wireless tag 312 is positioned within venue 306 and accessible by guest 304. In the example of FIG. 3, tag 312(1) is positioned on a display 314(1) and tag 312(2) is positioned on a display 314(2) and their presence may be indicated to guest 304. Displays 314 may provide venue information, may represent paid ads, or may represent ads associated with venue 306. Display 314 may include instructions for using tag 312, and may indicate the presence and location of tag 312 to guest 304.

In the example of FIG. 3, tag 312(1) includes at least one URL 313(1) that identifies a web page 316(1) hosted by wireless server 308, and tag 312(2) includes at least one URL 313(2) that identifies a web page 316(2) hosted by wireless server 308. Wireless server 308 communicates with ad server 310, via network 320 for example, to retrieve ads 302 from ad database 318 for inclusion within web page 316.

Guest 304 has a portable media device 322 that has network capability (e.g., a mobile phone or tablet device that cooperates with a wireless Internet connection and/or a cell phone carrier) and includes a wireless reader 324 for reading a wireless tag 312 when in close proximity (e.g., within about 8 inches) thereto. In one example of operation, guest 304 places device 322 in close proximity to tag 312(1) whereupon device 322 automatically reads digital content 313(1) that includes a URL from wireless tag 312(1), connects to web page 316(1) designated by the URL, and receives ad 302(1).

Wireless tag 312 may be attached to static items, such as displays or seats, or may be attached to mobility devices for moving people within the venue. In one example, where venue 306 is a ski resort, a display 314 is mounted on a restraining bar of a chair of a ski lift at the resort and may include a map, resort information, and paid advertisements. Tag 312 is mounted on the chair or within display 314; in particular, tag 312 may be mounted with an advertisement of display 314 (e.g., tag 312 may be within or adjacent to the advertisement). In another example, where venue 306 is a ski resort, tag 312 is mounted on or proximate display 314 within a cabin of a gondola lift or a shuttle bus at the resort. In another example, where venue 306 is an amusement park and the mobility device is a ride, tag 312 is mounted within reach of guest 304 while seated in the ride. In another example, venue 306 represents a sports stadium and tag 312 is mounted within reach of guest 304 while seated in the stadium.

In one embodiment, tags 312 are associated with contents of display 314 and digital content 313 stored within the tags identify ads 302 selected for display in association with the contents. That is, web page 316(1) addressed by the URL in digital content 313(1) has one or more selected ads 302(1) associated with display 314(1). In another embodiment, tags 312 contain the same digital content 313 (i.e., URLs contained in digital content 313(1) and 313(2) are the same) and one web page 316 selects random or time specific advertisements from ad database 318 for display to guest 304. That is, the displayed ads 302 are not specifically associated with display 314.

In one embodiment, functionality of wireless server 308, displays 314 and wireless tags 312 of system 300 is provided as a service to an advertiser in exchange for revenue. The advertiser provides ad server 310 and ads 302 to wireless server 308 together with information for display on displays 314. In one example, displays 314 and wireless tags 312 are provided for a first fee and each delivered ad 302 to device 322 as a result of device 322 reading one tag 312 accrues a second fee. Further fees may be generated by arrangements wherein an advertiser pays for information of guest 304 and/or the guest's portable media device 322; for example, fees may become due when guest 304 indicates interest in an advertisement by selecting related web pages accessible through the URL, by entering an email address, phone number or other contact information for follow up by an advertiser, etc. as discussed further below. Information of guest 304, as well as statistics that summarize the number and times that portable media devices 322 accessed wireless tags 312, may be referred to herein as utilization information.

In one example of operation, guest 304 sees display 314(2) and operates device 322 to read tag 312(2). Device 322 automatically retrieves ad 302(2) from ad server 310 and displays the contents of ad 302(2) to guest 304. Ad 302(2) includes a button that, upon selection by guest 304, automatically confirms purchase of the advertised product of ad 302(2). In one embodiment, guest 304 configures device 322 to automatically provide contact information of guest 304 to an advertiser's web page when device 322 reads a certain type of tag 312. For example, tags 312 may include a characterization value within digital content 313 that characterizes the type of information (e.g., advertisement, venue information, coupon, and so on) provided by the tag. Guest 304 may configure device 322 to automatically provide contact information of guest 304 to a web page associated with a scanned tag of a selected type. For example, guest 304 may configure device 322 to automatically provide contact information to apparel advertisers when their tag 312 is scanned by device 322. The advertisers may then follow up with guest 304 regarding the advertised product.

In another embodiment, device 322 is configured with a monetary value (e.g., linked to a financial account or preloaded with a cash value) such that when guest 304 reads tag 313(2), device 322 automatically authorizes payment and/or delivery of the advertised product to an address also configured within device 322.

Figure 4:
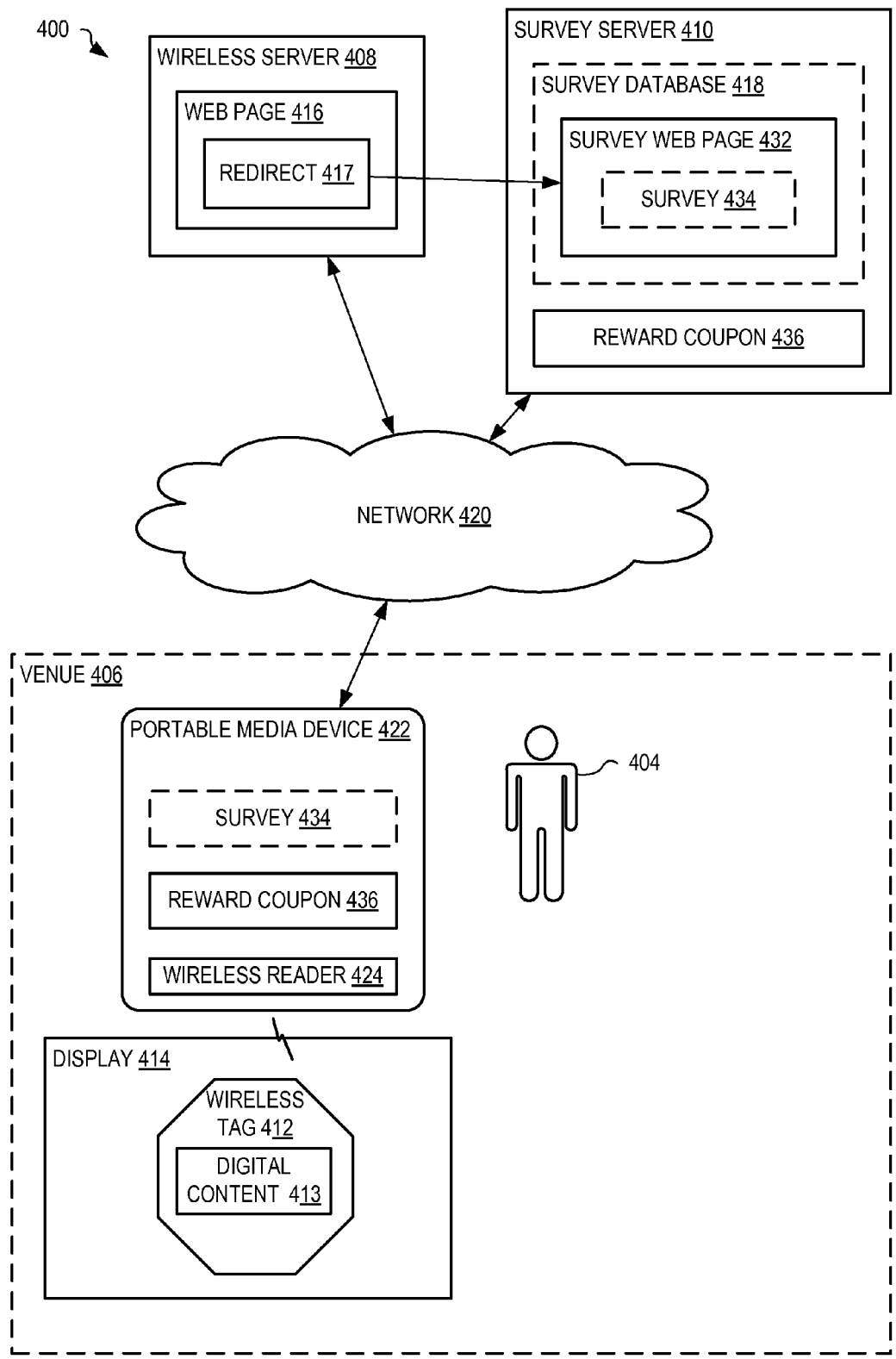
FIG. 4 shows one exemplary wireless system for presenting a survey to a guest at a venue, in an embodiment.

FIG. 4 shows one exemplary wireless system 400 for presenting a survey 402 to a guest 404 at a venue 406. System 400 includes at least one wireless tag 412 and a wireless server 408. Wireless server 408 is connected to, and accessible via, a network 420. Network 420 is for example on or more of a local area network, and wide area network, and the Internet. A survey server 410 is also connected to the network 420, and may also be in direct communication (e.g., connected on a local network) with wireless server 408. In one embodiment, functionality of wireless server 408 and survey server 410 are co-located and/or combined into a single server. Survey 402 and associated responses from guest 404 may be stored within a survey database 418 within survey server 410, for example.

Wireless tag 412 is positioned within venue 406 and accessible by guest 404. In the example of FIG. 4, tag 412(1) is positioned on a display 414 and the presence of tag 412 may be indicated to guest 404. Display 414 may provide venue information, may represent paid ads, may represent ads associated with venue 406, and may contain other information. Display 414 may include instructions for using tag 412, and may indicate the presence and location of tag 412 to guest 404.

In the example of FIG. 4, tag 412 includes digital content 413, including at least one URL that identifies a web page 416 hosted by wireless server 408. Web page 416 contains a redirect 417 that redirects any accessing client to at least one survey web page 432 hosted by survey server 410. Survey web page 432 presents a survey 434 with which a viewer may interact.

Guest 404 has a portable media device 422 that has network capability (e.g., a mobile phone or tablet device that cooperates with a wireless Internet connection and/or a cell phone carrier) and includes a wireless reader 424 for reading tag 412 when in close proximity (e.g., within about 8 inches) thereto. In one example of operation, guest 404 places device 422 in close proximity to tag 412 whereupon device 422 automatically reads digital content 413 from wireless tag 412, connects to web page 416, gets redirected to survey web page 432, and receives survey 434 therefrom.

Wireless tag 412 may be attached to static items, such as displays, or may be attached to mobility devices for moving people within the venue. In one example, where venue 406 is a ski resort, tag 412 is mounted on a chair of a ski lift at the resort and display 414 is mounted on a restraining bar of the chair and may include a map, resort information, and paid advertisements. In another example, where venue 406 is a ski resort, display 414 is mounted within a cabin of a gondola lift or shuttle bus at the resort. In another example, where venue 406 is an amusement park, tag 412 is mounted within reach of guest 404 while seated in a ride. In another example, venue 406 represents a sports stadium and tag 412 is mounted with reach of guest 404 while seated in the stadium.

In one embodiment, guest 404 is enticed to complete (through interaction with survey server 410) survey 434 by offer of a reward coupon 436 upon completion of the survey. Reward coupon 436 is for example a coupon for use at venue 406, such as one of a discount at a shop, a discount at a restaurant, a lift discount, and so on. Where display 414 and tag 412 are mounted on a safety bar of a chair of a chair lift at a ski resort, survey completion is likely in view of the captive nature of guest 404 when riding the chair.

In one embodiment, functionality of wireless server 408, display 414 and wireless tag 412 of system 400 is provided as a service to venue 406 in exchange for revenue. Survey server 110 may be provided by a third party, or may optionally be provided as part of the functionality of system 400 in exchange for revenue. In one example, display 414 and wireless tag 412 are provided for a first fee and each access to web page 416 resulting in completion of survey 434 by guest 404 accrues an additional second fee. Information uploaded from portable media devices 422, such as survey responses and/or contact information of guests 404, as well as statistics that summarize the number and times that portable media devices 422 accessed wireless tags 412, may also be referred to herein as utilization information.

Figure 5:
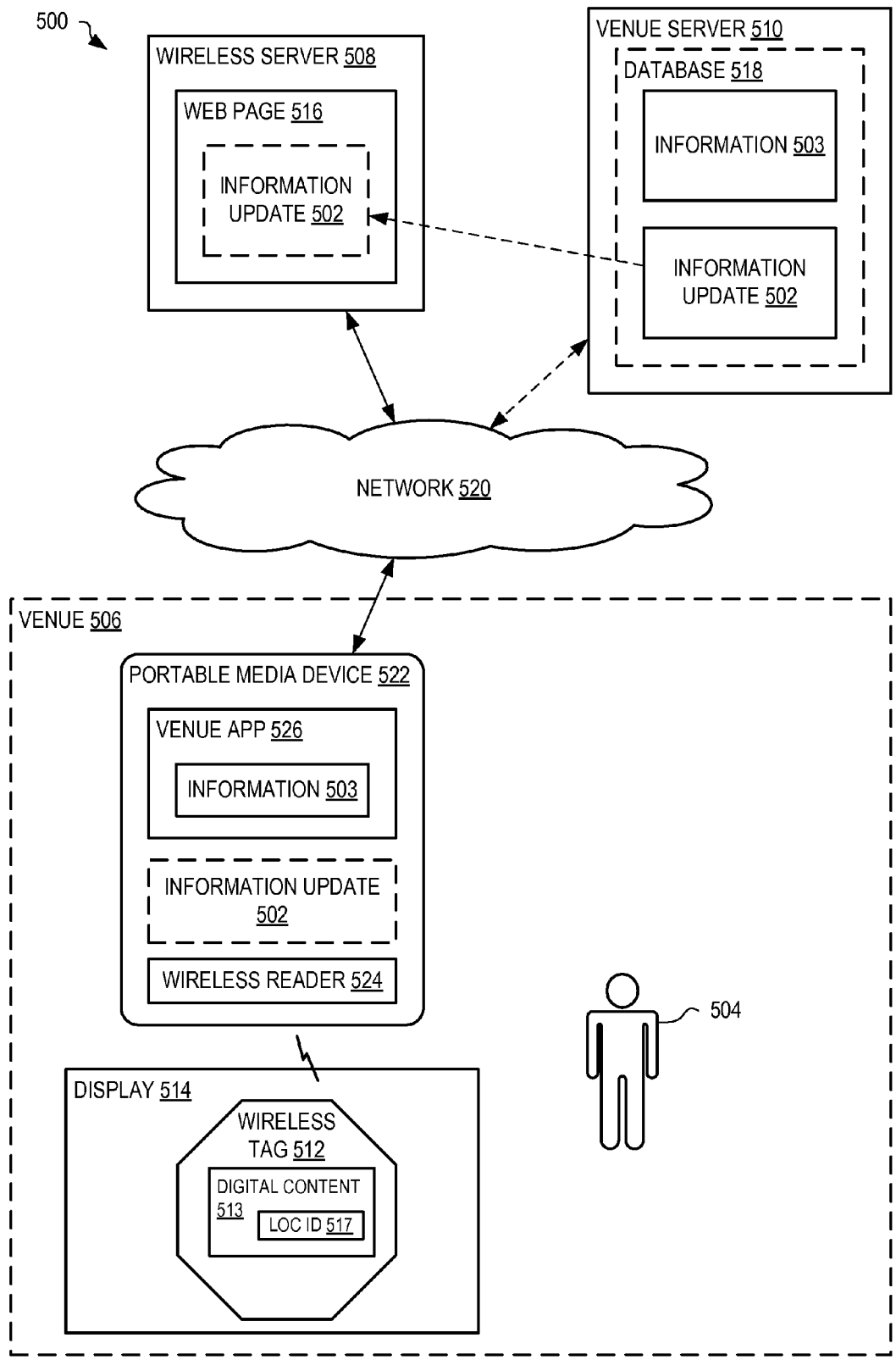
FIG. 5 shows one exemplary wireless system for providing updated information to a guest at a venue, in an embodiment.

FIG. 5 shows one exemplary wireless system 500 for providing updated information 502 to a guest 504 at a venue 506. System 500 includes at least one wireless tag 512 and a wireless server 508. Wireless server 508 is connected to, and accessible via, a network 520. Network 520 is for example one or more of a local area network, a wide area network, and the Internet. A venue server 510 may also connect to the network 520, and may also be in direct communication (e.g., connected on a local network) with wireless server 508. In one embodiment, functionality of wireless server 508 and venue server 510 are co-located and/or combined into a single server. Information update 502 may be stored within a database 518 within venue server 510, for example.

Wireless tag 512 is positioned within venue 506 and is accessible by guest 504. In the example of FIG. 5, tag 512 is positioned on a display 514 and the presence of tag 512 may be indicated to guest 504. Display 514 may provide venue information, may represent paid ads, may represent ads associated with venue 506, and may contain other information. Display 514 may include instructions for using tag 512, and may indicate the presence and location of tag 512 to guest 504.

In the example of FIG. 5, tag 512 includes digital content 513 including at least one URL that identifies a web page 516 hosted by wireless server 508 and a location ID 517 that identifies a location of tag 512 within venue 506. Web page 516 may include information update 502, retrieved from database 518 or may include a redirect to that information.

Guest 504 has a portable media device 522 that has network capability (e.g., a mobile phone or tablet device that cooperates with a wireless Internet connection and/or a cell phone carrier) and includes a wireless reader 524 for reading tag 512 when in close proximity (e.g., within about 8 inches) thereto. In one example of operation, guest 504 places device 522 in close proximity to tag 512 whereupon device 522 automatically reads digital content 513 and location ID 517 from wireless tag 512. In one embodiment, portable media device 522 automatically connects to web page 516 to retrieve information update 502, and may determine and display to guest 504 a location of guest 504 within venue 506 based upon location ID 517. In another embodiment, where a venue app 526, installed on portable media device 522, includes a list of locations within venue 506 that is indexed by location ID 517, venue app 526 automatically determines the location of guest 504 based upon location ID 517 read from tag 512. Specifically, tag 512 is positioned at a location within venue 506 corresponding to location ID 517 programmed within tag 512.

Wireless tag 512 may be attached to static items, such as displays, or may be attached to mobility devices for moving people within the venue. In one example, where venue 506 is a ski resort, tag 512 is mounted on a chair of a ski lift at the resort and display 514 is mounted on a restraining bar of the chair and may include a map, resort information, and paid advertisements. In another example, where venue 506 is a ski resort, display 514 is mounted within a cabin of a gondola lift or shuttle bus at the resort. In another example, where venue 506 is an amusement park, tag 512 is mounted within reach of guest 504 while seated in a ride. In another example, venue 506 represents a sports stadium and tag 512 is mounted with reach of guest 504 while seated in the stadium.

In one embodiment, functionality of system 500 is provided to venue 506 in exchange for revenue. Display 514 and wireless tag 512 are provided for a first fee, and each access to web page 516 resulting from device 522 reading tag 512 accrues an additional second fee.

Figure 6:
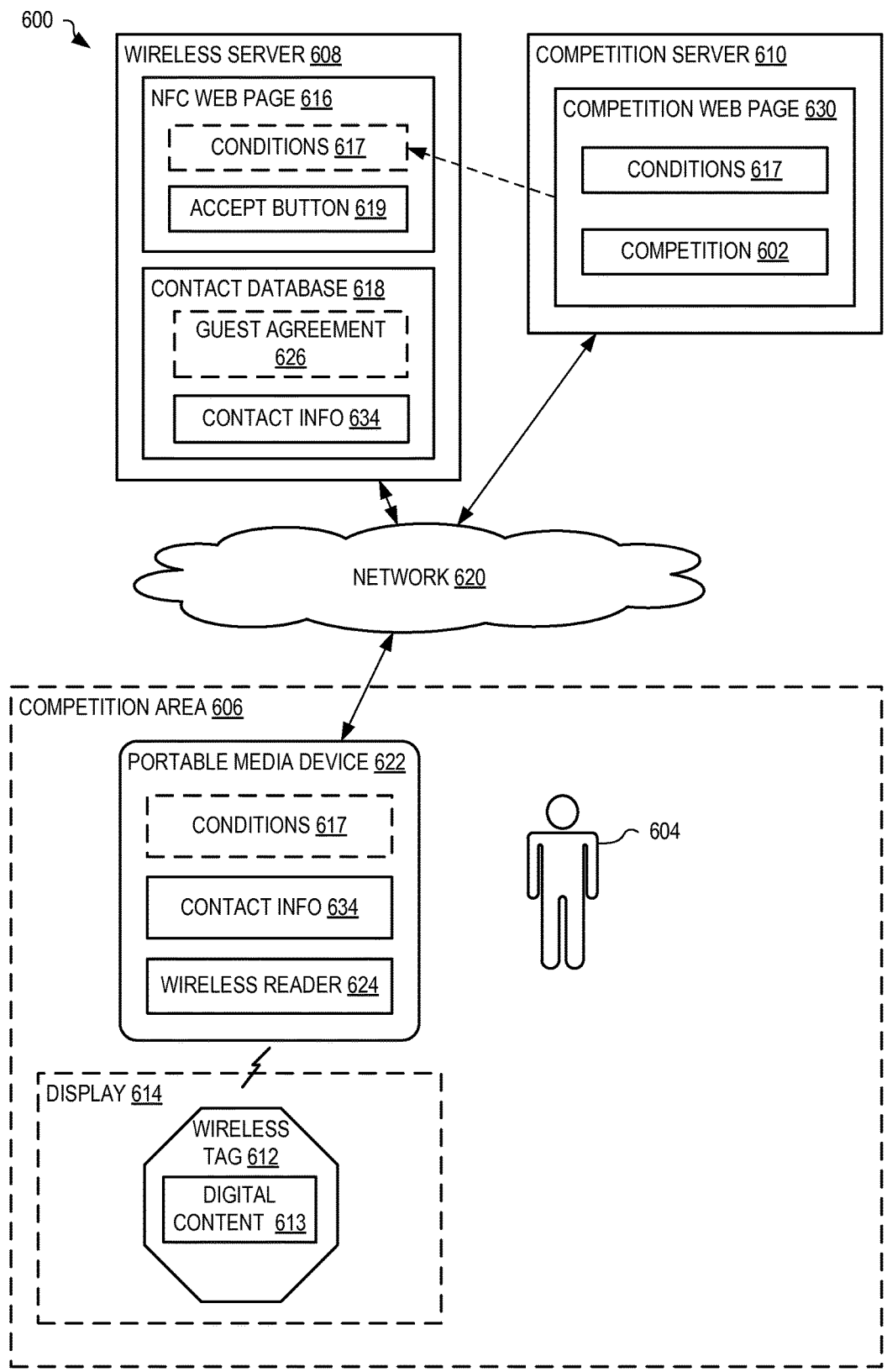
FIG. 6 shows one exemplary wireless system for collecting contact information of a guest entering a competition, in an embodiment.

FIG. 6 shows one exemplary wireless system 600 for collecting contact information of a guest 604 entering a competition 602. System 600 includes at least one wireless tag 612 and a wireless server 608. Wireless server 608 is connected to, and accessible via, a network 620. Network 620 is for example one or more of a local area network, a wide area network, and the Internet. A competition server 610 provides a competition web page 630, connects to the network 620, and may also be in direct communication (e.g., connected on a local network) with wireless server 608. In one embodiment, functionality of wireless server 608 and competition server 610 are co-located and/or combined into a single server. In one example, competition 602 is open to guests at a ski resort (e.g., venue 106 of FIG. 1). In another example, competition 602 is open to guests at a stadium.

Optionally, wireless tag 612 is positioned within competition area 606 that limits entry to competition 602 to guests located within area 606. In the example of FIG. 6, tag 612 is positioned on a display 614 and the presence of tag 612 may be indicated to guest 604 thereon. Display 614 for example provides competition information and may contain paid ads and other information. In one example, competition is a prize draw. In one embodiment, display 614 includes instructions for entering competition 602 using tag 612, and may indicate the presence and location of tag 612 to guest 604.

In the example of FIG. 6, tag 612 includes digital content 613 that includes at least one URL that identifies a web page 616 hosted by wireless server 608. Web page 616 may include conditions 617 associated with competition 602, or may include a link to such information, and an accept button 619 that guest 604 may click on to indicate acceptance of conditions 617, whereupon wireless server 608 stores guest agreement 626, or an indication thereof, in a contact database 618.

Guest 604 has a portable media device 622 that has network capability (e.g., a mobile phone or tablet device that cooperates with a wireless Internet connection and/or a cell phone carrier) and includes a wireless reader 624 for reading tag 612 when in close proximity (e.g., within about 8 inches) thereto. In one example of operation, guest 604 places device 622 in close proximity to tag 612 whereupon device 622 automatically reads the URL included in digital content 613 from wireless tag 612, and automatically connects to web page 616 indicated by the URL, to retrieve conditions 617.

Wireless tag 612 may be attached to static items, such as displays, or may be attached to mobility devices for moving people within the venue. In one example, where area 606 is a ski resort, tag 612 is mounted on a chair of a ski lift at the resort and display 614 is mounted on a restraining bar of the chair and may include a map, resort information, and paid advertisements. In another example, where area 606 is a ski resort, display 614 is mounted within a cabin of a gondola lift or shuttle bus at the resort. In another example, where area 606 is an amusement park, tag 612 is mounted within reach of guest 604 seated in a ride. In another example, area 606 represents a sports stadium and tag 612 is mounted with reach of guest 604 seated in the stadium.

Guest 604 indicates acceptance of conditions 617 by clicking on accept button 619 of wireless web page 616 whereupon contact info 634 of guest 604 is transferred to wireless server 608 and stored within contact database 618 together with guest agreement 626.

Conditions 617 may include an agreement for use of contact information 634 for purposes of advertisement wherein information within contact database 618 may be sold to advertising companies. Guest 604 has an incentive to agree to conditions 617 to be able to enter competition 602. In one example, competition 602 is a prize draw with a prize of a new car, where accepting conditions 617 provides entry to the competition. Within a stadium, tags 612 may be located in seat-specific locations such as armrests, facing walls, and at the back of facing seats, or in common areas such as concessions, walkways and restrooms such that each guest 604 may utilize tag 614 to enter competition 602 when prompted.

In one embodiment, two tags 612 are used for responding to surveys or other questions, wherein a first of the two tags 612 indicates "yes" and a second of the two tags 612 indicates "no".

In one embodiment, functionality of wireless server 608, display 614, and wireless tag 612 are provided as a service to a third party in exchange for revenue. Optionally, functionality of competition server 610 is provided to the third party in exchange for revenue. Display 614 and tag 612 are provided for a first fee and each received guest agreement 626 and contact information 634 pair accrues an additional fee from the third party. In one embodiment, where competition server 610 is included within system 600, cost of prizes for competition 602 is paid for from service fees. Information uploaded from portable media devices 622, such as competition entries, guest agreement 626 and/or contact information 634 of guests 604, as well as statistics that summarize the number and times that portable media devices 622 accessed wireless tags 612, may also be referred to herein as utilization information.

In one embodiment, wireless tags (e.g., NFC tags and Bluetooth tags) are positioned at strategic locations around a venue and configured such that a first tag contains location information of a second tag, which in turn contains location information of a third tag, and so on. The location information may be in the form of clues that must be deciphered to determine an actual location of the next wireless tag. These wireless tags thereby provided a trail for a treasure hunt within the venue. Each tag may include other instructions (e.g., photograph yourself next to the blue kiosk viewable from this location) that results in the player collecting evidence of following and finding each wireless tag. In one example, advertising may also be included within, or associated with, each wireless tag such that the player is exposed to such advertising when following the trail. In one embodiment, each tag includes a URL to a web page that includes the location information.

Figure 7:
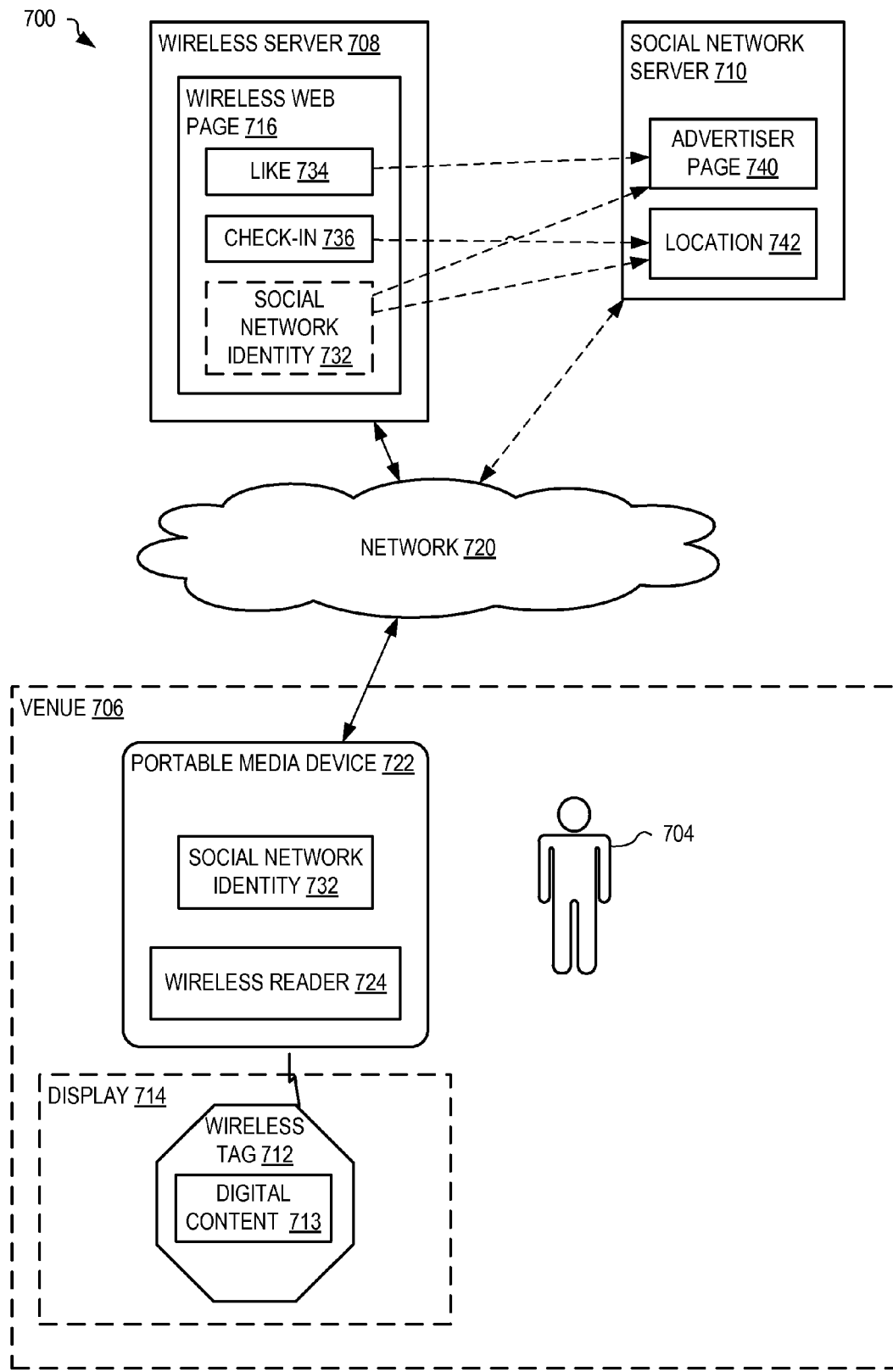
FIG. 7 shows one exemplary wireless system for automatically updating a social networking server, in an embodiment.

FIG. 7 shows one exemplary wireless system 700 for automatically updating a social networking server 710. System 700 includes at least one wireless tag 712 and a wireless server 708. Wireless server 708 is connected to, and accessible via, the network 720. A social network server 710 is for example a Facebook server that provides a status of a user based upon input by the user and by others. For example, social network server 710 may provide an advertiser page 740 that indicates popularity of the advertiser and a location 742 that provides popularity of the location. Social network server 710 connects to network 720 and may also be in direct communication (e.g., connected on a local network) with wireless server 708. In one embodiment, functionality of wireless server 608 and social network server 710 are co-located and/or combined into a single server.

Wireless tag 712 is positioned within venue 706 and is accessible by guest 704. In the example of FIG. 7, tag 712 is positioned on a display 714 and the presence of tag 712 may be indicated to guest 704 thereon. In one embodiment, display 714 is an advertisement associated with advertiser page 740 and tag 712 includes digital content 713, including a URL that identifies wireless web page 716 hosted by wireless server 708. Web page 716 includes a "like" button 734 that, when selected by guest 704, indicates that guest 704 likes the advertised product. In another embodiment, display 714 identifies a location 742 and digital content 713 of tag 712 includes a URL that identifies wireless web page 716. Web page 716 contains a "check-in" button 736 that allows guest 704 to automatically check into location 742 within social network server 710.

Guest 704 has a portable media device 722 that has network capability (e.g., a mobile phone or tablet device that cooperates with a wireless Internet connection and/or a cell phone carrier) and includes a wireless reader 724 for reading tag 712 when in close proximity (e.g., within about 8 inches) thereto. Device 722 also includes a social network identity 732 of guest 704 in association with social network server 710. In one example of operation, guest 704 places device 722 in close proximity to tag 712 whereupon device 722 automatically reads digital content 713, including a URL, from wireless tag 712 and automatically connects to web page 716 corresponding to the URL. Guest 704 then selects (clicks on) like button 734 which sends social network identity 732 of guest 704 to social network server 710 (optionally via wireless server 708) together with an indication of advertiser page 740 such that guest 704 automatically likes the advertised product. In one embodiment, like button 734 is selected automatically such that guest 704 may "like" the product on display 714 by simply placing portable media device 722 proximate tag 712.

In another example of operation, guest 704 places device 722 proximate tag 712 to automatically "check-in" to a location associated with display 714, whereupon wireless server 708 automatically receives social network identity 732 of guest 704 from device 722 and initiates "check-in" to location 742 of guest 704.

Wireless tag 712 may be attached to static items, such as displays, or may be attached to mobility devices for moving people within the venue. In one example, where venue 706 is a ski resort, tag 712 is mounted on a chair of a ski lift at the resort and display 714 is mounted on a restraining bar of the chair and may include a map, resort information, and paid advertisements. In another example, where venue 706 is a ski resort, display 714 is mounted within a cabin of a gondola lift or shuttle bus at the resort. In another example, where venue 706 is an amusement park, tag 712 is mounted within reach of guest 704 seated in a ride. In another example, venue 706 represents a sports stadium and tag 712 is mounted with reach of guest 704 seated in the stadium.

In one embodiment, functionality of wireless server 708, display 714, and wireless tag 712 of system 700 are provided to venue 706 for financial reward. Display 714 and wireless tag 712 are provided for a first fee to venue 706. Each "like" of advertiser page 740 accrues an additional fee to an owner of page 740. Information uploaded from portable media devices 722, such as information about social media participation and/or contact information of guests 704, as well as statistics that summarize the number and times that portable media devices 722 accessed wireless tags 712, may also be referred to herein as utilization information.

Figure 8:
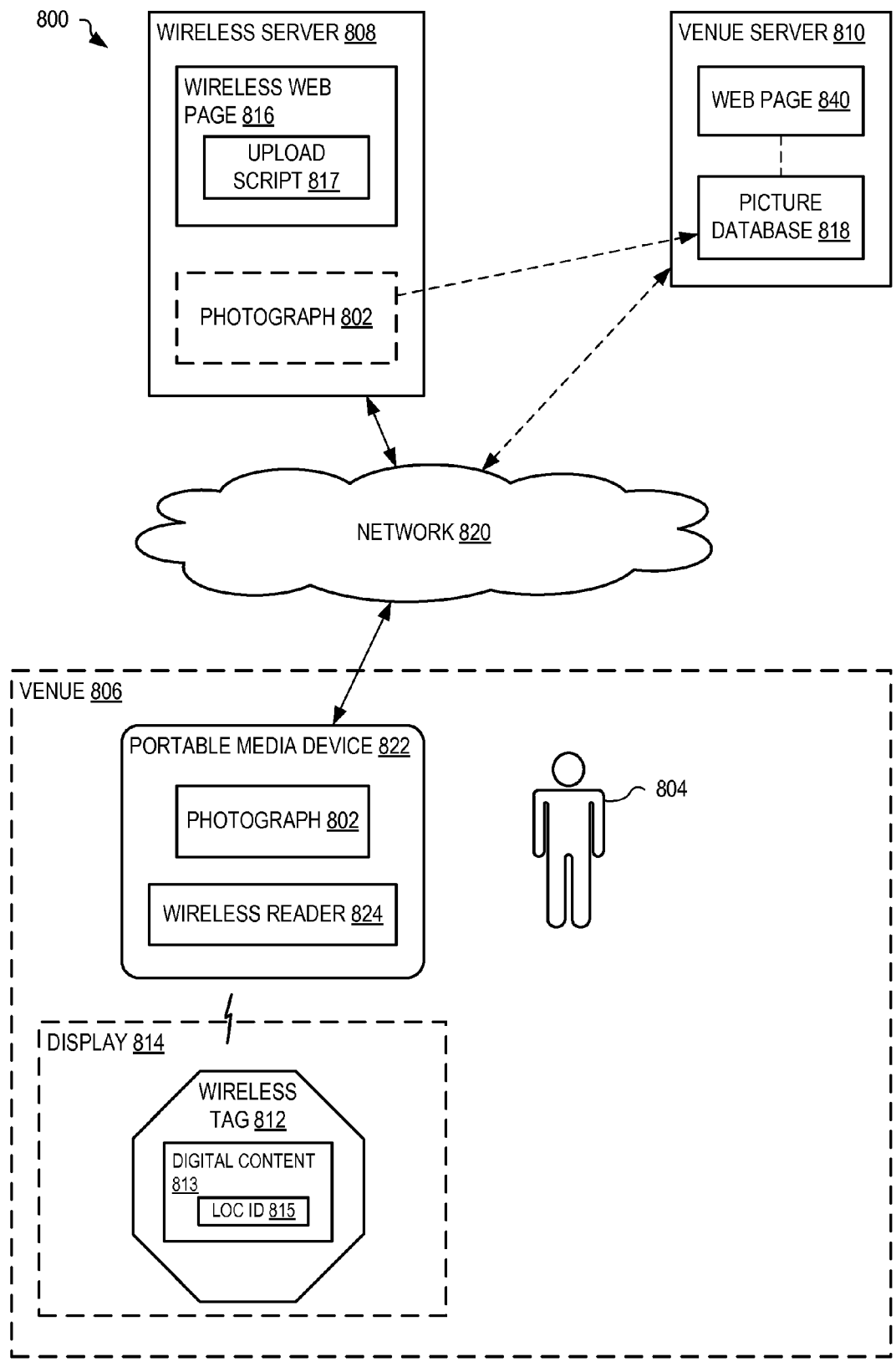
FIG. 8 shows one exemplary wireless system for uploading a photograph of a guest at a venue, in an embodiment.

FIG. 8 shows one exemplary wireless system 800 for uploading a photograph 802 of a guest 804 at a venue 806. System 800 includes at least one wireless tag 812 and a wireless server 808. Wireless server 808 is connected to, and accessible via, the network 820. A venue server 810 may also connect to the network 820, and may also be in direct communication (e.g., connected on a local network) with wireless server 808. In one embodiment, functionality of wireless server 808 and venue server 810 are co-located and/or combined into a single server.

Wireless tag 812 is positioned within venue 806 and is accessible by guest 804. In the example of FIG. 8, tag 812 is positioned on a display 814 and the presence of tag 812 may be indicated to guest 804. Display 814 may provide venue information, may represent paid ads, may represent ads associated with venue 806, and may contain other information. Display 814 may include instructions for using tag 812, and may indicate the presence and location of tag 812 to guest 804.

In the example of FIG. 8, tag 812 includes digital content 813 including at least one URL that identifies a web page 816 hosted by wireless server 808 and a location ID 815 that identifies a location of tag 812 within venue 806. Web page 816 may include an upload script 817 for uploading a photograph 802 to a picture database 818 of venue server 810.

Guest 804 has a portable media device 822 that has network capability (e.g., a mobile phone or tablet device that cooperates with a wireless Internet connection and/or a cell phone carrier) and includes a wireless reader 824 for reading tag 812 when in close proximity (e.g., within about 8 inches) thereto. In one example of operation, guest 804 places device 822 in close proximity to tag 812 whereupon device 822 automatically reads digital content 813 and location ID 815 from wireless tag 812. Portable media device 822 automatically connects to web page 816 corresponding to a URL within digital content 813, and executes upload script 817 to transfer photograph 802 from device 822 to picture database 818, and associate therewith a location based upon location ID 815.

Wireless tag 812 may be attached to static items, such as displays, or may be attached to mobility devices for moving people within the venue. In one example, where venue 806 is a ski resort, tag 812 is mounted on a chair of a ski lift at the resort and display 814 is mounted on a restraining bar of the chair and may include a map, resort information, and paid advertisements. In another example, where venue 806 is a ski resort, display 814 is mounted within a cabin of a gondola lift or shuttle bus at the resort. In another example, where venue 806 is an amusement park, tag 812 is mounted within reach of guest 804 while seated in a ride. In another example, venue 806 represents a sports stadium and tag 812 is mounted with reach of guest 804 while seated in the stadium.

Figure 9:
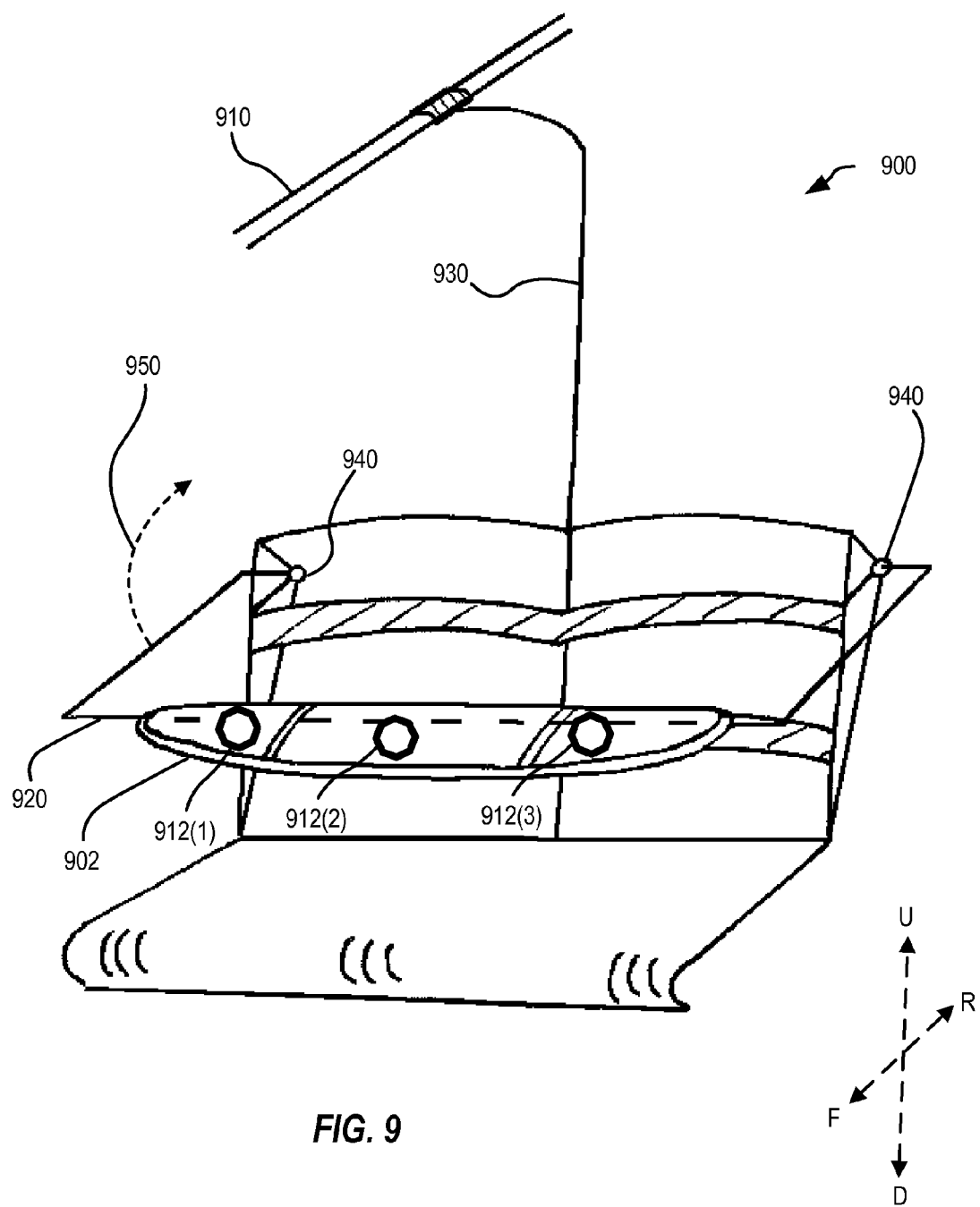
FIG. 9 illustrates a media display system installed on a ski-lift chair, in an embodiment.

FIG. 9 illustrates a media display system 902 installed on a ski-lift chair 900. Chair 900 is suspended from cable 910, and has a restraint bar 920 shown in a "down" position. In FIG. 9, a frontward (F) and rearward (R) direction are indicated by a short, dashed arrow, and an upward (U) and downward (D) direction are indicated by a longer dashed arrow that is approximately parallel to a pole 930 that suspends chair 900. Restraint bar 920 may also assume an "up" position by rotating it in the direction of arrow 950 about one or more pivots 940. A rider of chair 900 typically boards the chair with restraint bar 920 in the "up" position, and once chair 900 lifts the rider off the ground, the rider pulls restraint bar 920 into the "down" position shown. It is appreciated that chair 900 and restraint bar 920 may take differing forms, or mount with one another differently, as compared to the configuration shown in FIG. 9 without departing from the scope hereof. Media display system 902 is shown with exemplary tags 912(1), 912(2) and 912(3) positioned thereon to allow a rider of chair 900 (i.e., a guest of the venue) to utilize tags 912 during transport. Tags 912(1) and 912(3) are positioned within ad displays of media display system 902 and tag 912(2) is positioned within a map display of media display system 902. Media display system 902 may be utilized with any one or more of systems 100, 300, 400, 500, 600, 700, and 800 of FIGS. 1, 3, 4, 5, 6, 7, and 8, respectively.

Figure 10:
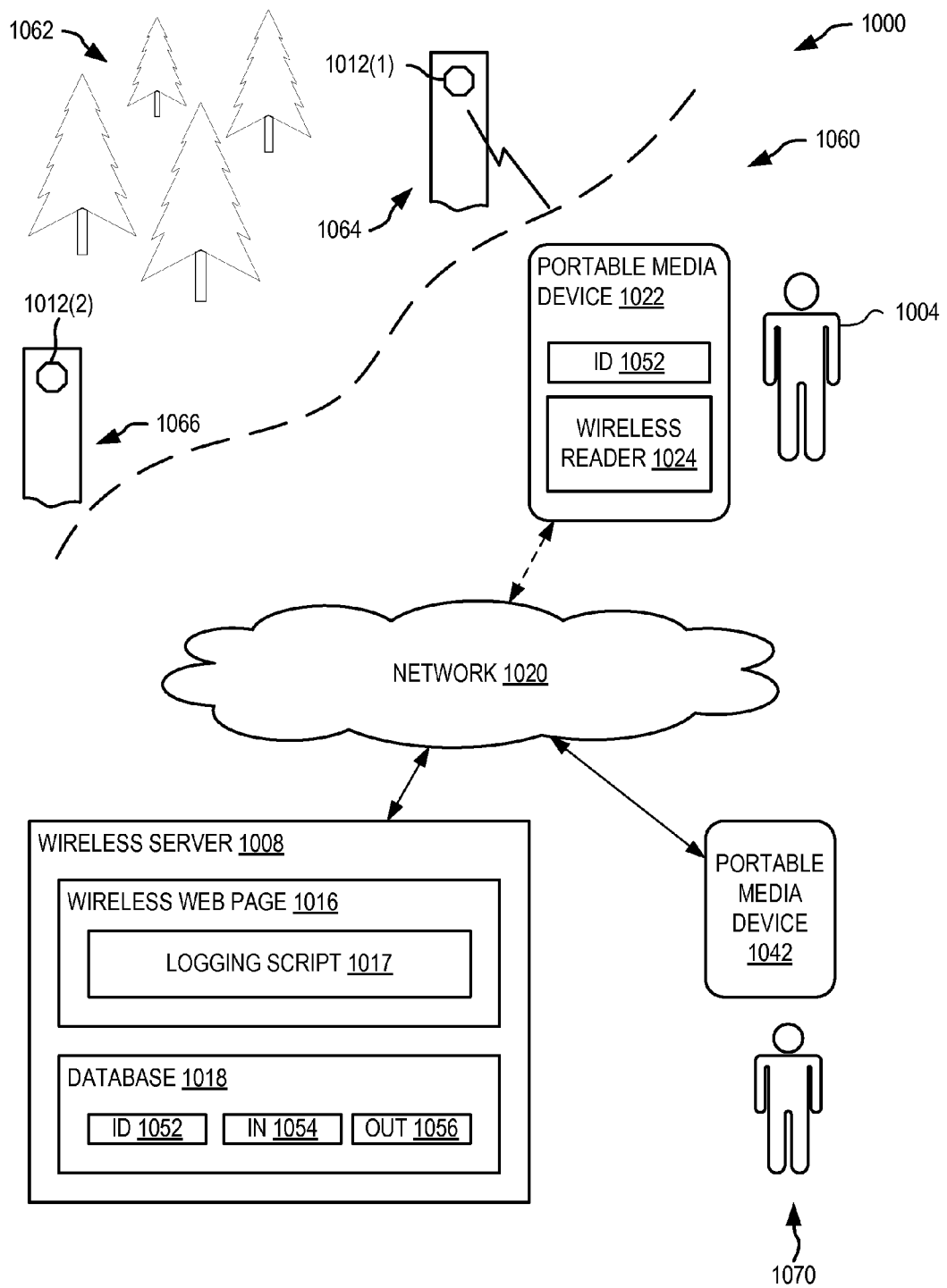
FIG. 10 shows one exemplary wireless system for tracking a guest at a venue, in an embodiment.

FIG. 10 shows one exemplary wireless system 1000 for tracking a guest 1004 at a venue. In the example of FIG. 10, a first wireless tag 1012(1) is located between a patrolled area 1060 to an un-patrolled area 1062 at a transition location 1064. Optionally, a second wireless tag 1012(2) is located at an exit location 1066 of the unpatrolled area 1062. Patrolled area 1060 may represent groomed slopes at a ski resort that are regularly patrolled by ski-patrol and unpatrolled area 1062 may represent an off-piste area at the ski resort that is not patrolled by the ski patrol. In another example, patrolled area 1060 represents a trail head and unpatrolled area 1062 represents one or more trailed areas leading from that trail head.

A wireless server 1008 is configured with a web page 1016 that includes a logging script 1017. Wireless server 1008 also includes a database 1018 for storing information logged by script 1017.

Each tag 1012 is similar to tag 112 and is programmed with a URL that identifies web page 1016.

Guest 1004 has a portable media device 1022 that has capability for accessing the network 1020 (e.g., via WiFi or via a mobile carrier) and includes (or couples with) a wireless reader 1024. Device 1022 also includes identification information 1052 that identifies guest 1004. Identification information (ID) 1052 is for example a mobile phone number of device 1022, or other identifying information that allows guest 1004 to be contacted and/or traced.

In one example of operation, guest 1004 uses device 1022 to read tag 1012(1) when passing from patrolled area 1060 into unpatrolled area 1062 at location 1064. Device 1022 uses wireless reader 1024 to read a URL from tag 1012(1) and then accesses wireless web page 1016 that corresponds to the URL, via network 1020. Script 1017 interacts with guest 1004 via device 1022 and receives ID 1052 from device 1022. wireless server 1008 stores ID 1052 within database 1018, together with a current check-in time 1054.

Guest 1004 then passes through unpatrolled area 1062 and emerges back into patrolled area 1060 at location 1066, where device 1022 is used to read the URL from tag 1012(2). Device 1022 then accesses wireless web page 1016, where logging script 1017 notes the check out time 1056 within database 1018.

Database 1018 may be automatically searched at the end of each day to identify a guest that has checked in but has not checked out. Contact attempts may be initiated to the identified guest, and if it is not determined that the identified guest has exited unpatrolled area 1062, a rescuer 1070 may be called to search for the missing guest. Rescuer 1070 may also utilize a portable media device 1042 to access additional information of database 1018 that may facilitate rescue of the guest. In one example, ID 1052 identifies guest 1004 within additional databases that provide additional information on the itinerary and abilities of guest 1004 that may facilitate the search and rescue.

Figure 11:
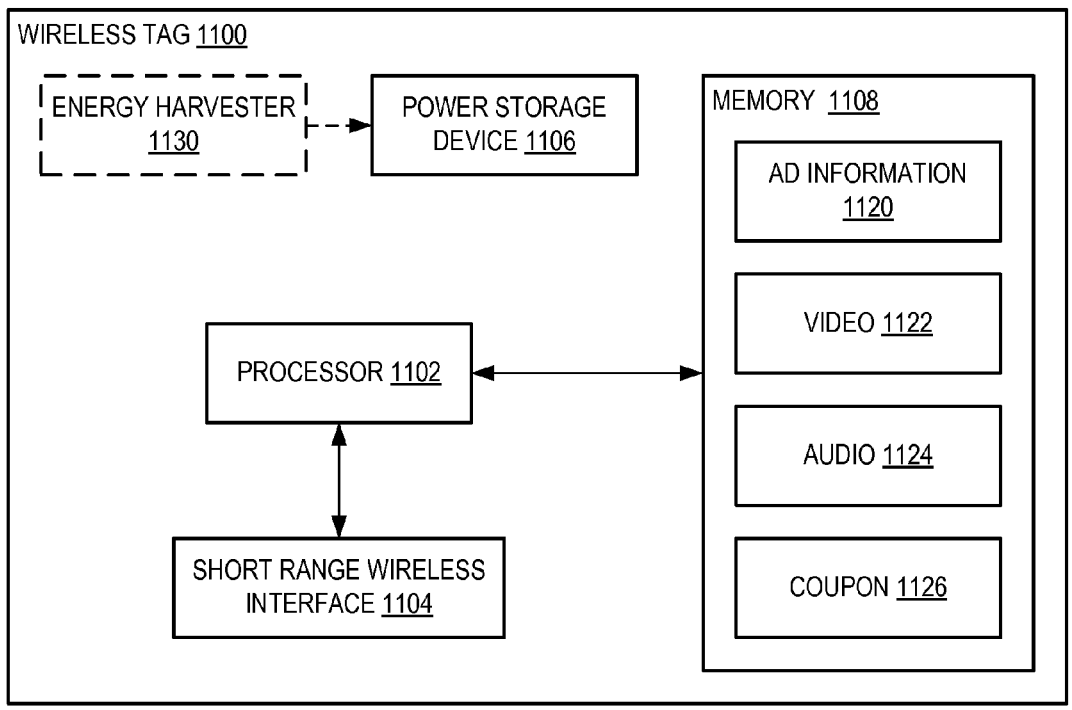
FIG. 11 shows one exemplary enhanced short range tag with a processor, a short range wireless interface, a battery, a memory, a video clip, an audio clip, and a coupon, in an embodiment.

FIG. 11 shows one exemplary enhanced short range wireless tag 1100 with a processor 1102, a short range wireless interface 1104, a power storage device 1106, a memory 1108 that may store one or more of advertising information 1120, a video clip 1122, an audio clip 1124, and a coupon 1126. Power storage device 1106 may be, for example, a battery or a capacitor, and provides power to processor 1102, interface 1104 and memory 1108. Processor 1102 and interface 1104 may implement an NFC protocol or a Bluetooth protocol. In one example, processor 1102 and interface 1104 are implemented as a chipset with Bluetooth 4.0 capability. Processor 1102 and interface 1104 may implement other wireless protocols without departing from the scope hereof. Tag 1100 thereby forms an active tag that may implement faster communication protocols and communicate larger amounts of information as compared to a passive NFC tag, for example.

Optionally, power storage device 1106 is a rechargeable battery and tag 1100 further includes an energy harvester 1130 that harvests energy from one or more ambient energy sources (e.g., solar, radio wave, thermal) to charge power storage device 1106 and/or power processor 1102, interface 1104 and memory 1108 directly. Interface 1104 is for example a Bluetooth interface for communicating with a portable communication device having Bluetooth capability, where in one or more of ad information 1120, video 1122, audio 1124, and coupon 1126 may be transferred to the portable communication device.

Where tag 1100 supports the Bluetooth 4.0 protocol, tag 1100 is advantageously low powered while providing storage and transfer capabilities that exceed those of NFC tags. Further, Bluetooth 4.0, which is already being incorporated into portable communication devices such as the Apple iPhone 4S, may communicate with other devices (e.g., tags) without the hassle of pairing, as with earlier versions of Bluetooth. Thus, tag 1100 may operate in a similar, but advanced, way to conventional NFC tags.

Figure 12:
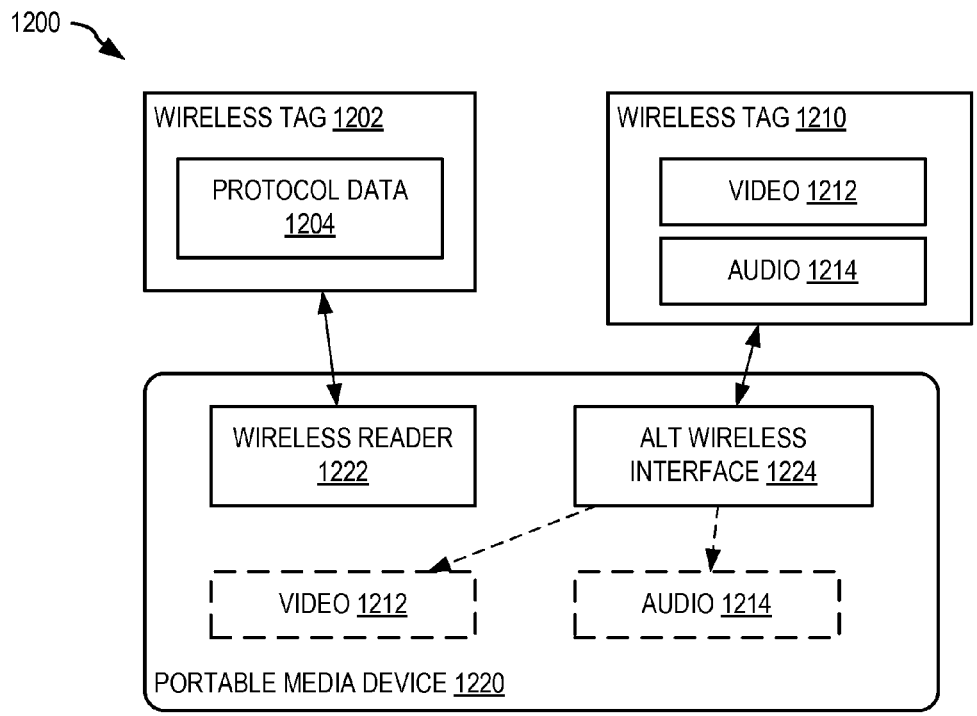
FIG. 12 shows one exemplary system for providing bulk advertising material to a portable communication device, in an embodiment.

FIG. 12 shows one exemplary system 1200 for providing bulk advertising material, such as for example video 1212 and/or audio 1214, to a portable communication device 1220. System 1200 includes a wireless tag 1202 that stores protocol data 1204 and an alternative wireless tag 1210 that stores video 1212 and/or audio 1214. Protocol data 1204 defines parameters for configuring an alternative wireless interface 1224 of portable communication device 1220 to communicate with wireless tag 1210. Tags 1202 and 1210 are positioned close to one another, for example.

In one example of operation, device 1220 is positioned proximate wireless tag 1202 such that a wireless reader 1222 of device 1220 reads protocol data 1204 from tag 1202. Device 1220 then configures an alternative wireless interface 1224 (e.g., a Bluetooth interface) for communicating with wireless tag 1210 (e.g., a Bluetooth based tag). Device 1220 may then transfer video 1212 and/or audio 1214 (or other information stored within tag 1210) at a faster transfer rate supported by tag 1210 than would be possible when communicating with wireless tag 1202.

Contents of tag 1210 (e.g., video 1212 and/or audio 1214) may be updated using a programming device that includes a compatible wireless interface (e.g., Bluetooth).

Generating Revenue from Tags

Figure 13:
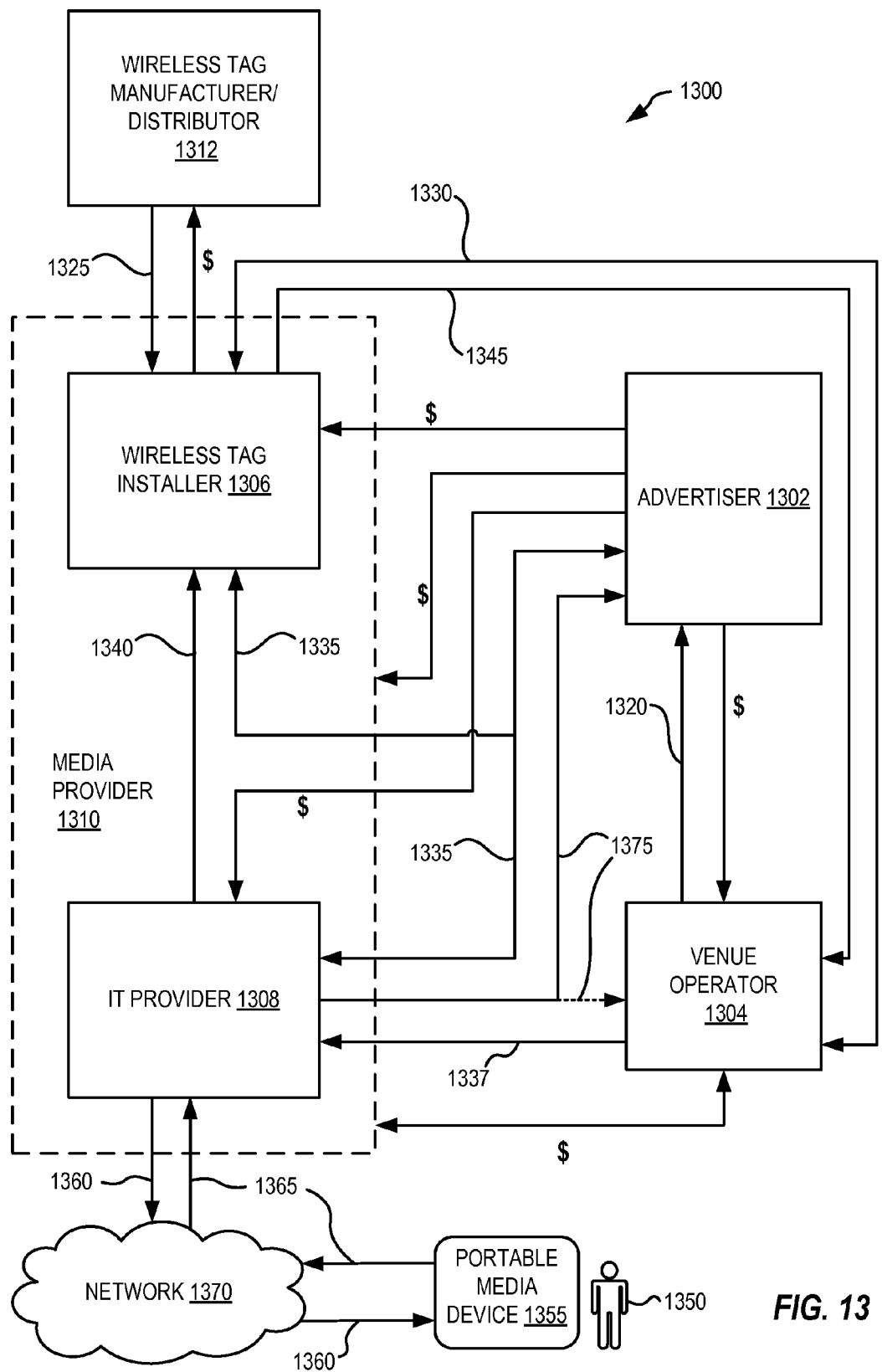
FIG. 13 illustrates typical business relationships among entities that may be involved in installing and operating wireless tag communication applications for a venue.

FIG. 13 illustrates typical business relationships among entities that may be involved in installing and operating wireless tag communication applications for a venue. In FIG. 13, the business entities involved are depicted as boxes, while arrows depict movement of physical goods, information or revenue. All instances of revenue transfer are denoted by $.

An advertiser 1302 is typically involved, because advertising or media exposure is a typical source of commercial value in such applications. A venue operator 1304 is typically involved to at least provide approval 1320 to advertiser 1302 to control what types of physical installations, and what kind of advertising, are permitted in the venue. Venue operator 1304 may receive revenue from the advertiser. In certain embodiments, a venue operator may wish to install and operate wireless tag applications for its own benefit, such as to provide information related solely to the venue itself; in these embodiments all activities including exchanges of revenue, described herein as being performed by advertiser 1302 are considered herein as performed by the venue operator 1304.

Wireless tags are typically installed in the venue by a wireless tag installer 1306, and web content, including websites that are accessible through URLs provided by the wireless tags, are provided and maintained by an information technology (IT) provider 1308. In certain embodiments, a single company, denoted herein as wireless media provider 1310, may be responsible for both the installation of wireless tags and provision of web content, in these embodiments all activities including exchanges of revenue involving either wireless tag installer 1306 or IT provider 1308 are considered herein as performed by the wireless media provider 1310.

To set up the wireless tag communication applications, wireless tags 1325 are typically purchased by wireless tag installer 1306 from a wireless tag manufacturer or distributor. Wireless tag installer 1306 typically exchanges installation specifications 1330 with venue operator 1304 to their mutual satisfaction. For example, venue operator 1304 may communicate the number and type of wireless tag installations (e.g., seats, including moveable seats such as rides, chairlifts, gondolas etc.) that are required to serve the venue, and may set aesthetic or safety constraints upon wireless tag installer 1306. Installer 1306 may propose specifications that are standard for its usual installations, or that are required to make the installed wireless tags work properly.

Advertiser 1302 and IT provider 1308 typically exchange information 1335 to at least partially specify the number, type, content and functionality of the websites that will be addressable through wireless tags 1325. Information 1335 may also involve wireless tag installer 1306, when it is desired to coordinate website addressability with a number of wireless tags at the venue, as noted above in connection with installation specifications 1330. For example, to identify a portable media device that interacts with a specific facility within a venue, such as a specific seating section, table or chairlift may require equally specific information to be transmitted from the wireless tags associated therewith. Venue operator 1304 may also provide information 1337 to IT provider 1308 to further specify the number, type, content and functionality of the websites that will be addressable through wireless tags 1325. Information 1337 may include time sensitive information such as updates about specific features of the venue, offers that are only available on a short term basis, weather forecast for outdoor venues, snow conditions, etc.

Once the websites and URLs that can access the websites are defined, IT provider 1308 provides the URLs or other digital content 1340 that is to be provided in digital form on the wireless tags, to wireless tag installer 1306. (In certain embodiments, URL or other digital content 1340 is passed back to wireless tag manufacturer or distributor 1312, who provides wireless tags 1325 pre-programmed or configured with information 1340.) Wireless tags that are configured with the URL or other digital information required for a given installation are denoted as wireless tags 1345. Once tag installer 1306 has wireless tags 1345 and has settled installation specifications 1330 with venue operator 1304, tag installer installs wireless tags 1345 within the venue, and receives revenue (either directly from advertiser 1302, or indirectly as part of wireless media provider 1310). Installation of wireless tags 1345 may include first integrating tags 1345 with other structure and then installing the other structure within the venue. For example, tags 1345 may first be integrated with armrests or seat backs for installation at a venue that includes individual seats, such as a theater or stadium. Alternatively, tags 1345 may first be integrated with items that are particular to small groups being served at a venue, such as a table, a scoring desk of a bowling alley, or a media display system that includes a ski area map, safety information and/or advertising and is mounted on a chairlift or gondola.

In operation, IT provider 1308 provides information services through a network 1370 to and/or from guests 1350 at the venue, who access information by causing their portable media devices 1355 to interact first with wireless tags 1345. The types of information services provided are described elsewhere herein from a transactional perspective, but two technology options are notable here: information 1360 is downloaded from IT provider 1308 to portable media device 1355, while information 1365 is uploaded from device 1355 to IT provider 1308. Downloaded information 1360 may include, for example, Web based content that advertiser 1302 and/or venue operator 1304 find value in providing to guest 1350, even if the identity of the guest is not known to advertiser 1302 or venue operator 1304. Such information may support many of the modalities described previously, such as providing advertisements, permanent or updated information about the venue, discounts and giveaways, eligibility for participation in social media, etc. Other modalities, such as providing targeted advertising, "like" and "check-in" features, and requirements for guest permission or acceptance of terms, may be enabled by two-way information transfer. In such cases, portable media device 1355 downloads information 1360 from IT provider 1308 and IT provider 1308 receives information 1365 back from device 1355.

IT provider 1308 may provide utilization information 1375 back to advertiser 1302 and, optionally, to venue operator 1304. Utilization information 1375 may include, for example, statistics about how many times portable media devices 1355 initiated contact to IT provide 1308 through wireless tags 1345 (and which specific wireless tags 1345 were used to initiate the contact), and accordingly, how many times information 1360 was downloaded. Such statistics may be utilized as a basis for compensation provided by advertiser 1302 and/or venue operator 1304 to IT provider 1308 or wireless media provider 1310. Utilization information 1375 may also include information 1365 that is uploaded from portable media devices 1355 through two-way information transfers, and/or statistics about information 1365. Such statistics and/or information may also be utilized as a basis for compensation provided by advertiser 1302 and/or venue operator 1304 to IT provider 1308 or wireless media provider 1310.

In one business example, venue 106 of FIG. 1 pays a media company to provide and display poster 114 with wireless tag 112, where tag 112 is programmed with digital content 113 including a URL to a web page of a server (e.g., venue server 110) of venue 106.

In a further business model, the media company provides use of wireless server 108 for an additional charge that provides advertising and/or information 102 in association with digital content 113. Such charge may be based upon, or an additional fee levied may be based upon, the number of times the server is accessed as a result tag 112 being read by devices (e.g., device 122). The media company may also charge for managing the content of web pages, provided by the server.

Further to charging a fee for providing venue information to guests at the venue, the media company may also provide paid advertising, where the advertiser pays an additional fee to the media company to have a wireless tag incorporated with a poster display. The media company may also charge the advertiser an additional fee each time a guest accesses a URL associated with the fee. Optionally, where the wireless tag keeps track of the number of times it is read, the media company may charge a fee based upon this number.

Where the media company collects additional information from a guest accessing a web page associated with a URL in the tag, that additional information may be sold to the advertiser, or the advertiser may be charged to access that information.

In an alternative business model, the media company does not initially charge for displaying the advertising, but charges the advertiser for each guest that access a web site associated with a URL within the tags, and receives a commission for each generated lead, a commission on each product sold, or a fee if the guest submits personal data to the advertiser.

Where the tag is linked to a social media network, the media company may charge for each "Check in" or "like" generate by the guest through interaction with the tag. Where the tag promotes a brand directly through displayed digital content, or includes a URL that links to a promotion of a brand, the media company may charge a fee for each guest to which the digital content is displayed, or who accesses a Web page or enters a promotion by accessing the URL.

Where an advertisement associated with a tag is for real estate, each lead generated when a guest accesses the tag may be sold to real estate brokers as a list.

Where a tag is associated with an advertisement offering a sample of a product, consumer information may be collected using a web page accessed through an associated URL of the tag, and forwarded, for a fee, to the advertiser. For example, guests that are interested in receiving a sample of consumer goods, e.g., sun screen) read the tag to access a web page where they enter their delivery address. The server sends the address to the advertiser, who sends a sample of the sun screen to the guest, wherein the media company receives a fee for each sample sent out by the advertiser as a result of the tag.

Figure 14:
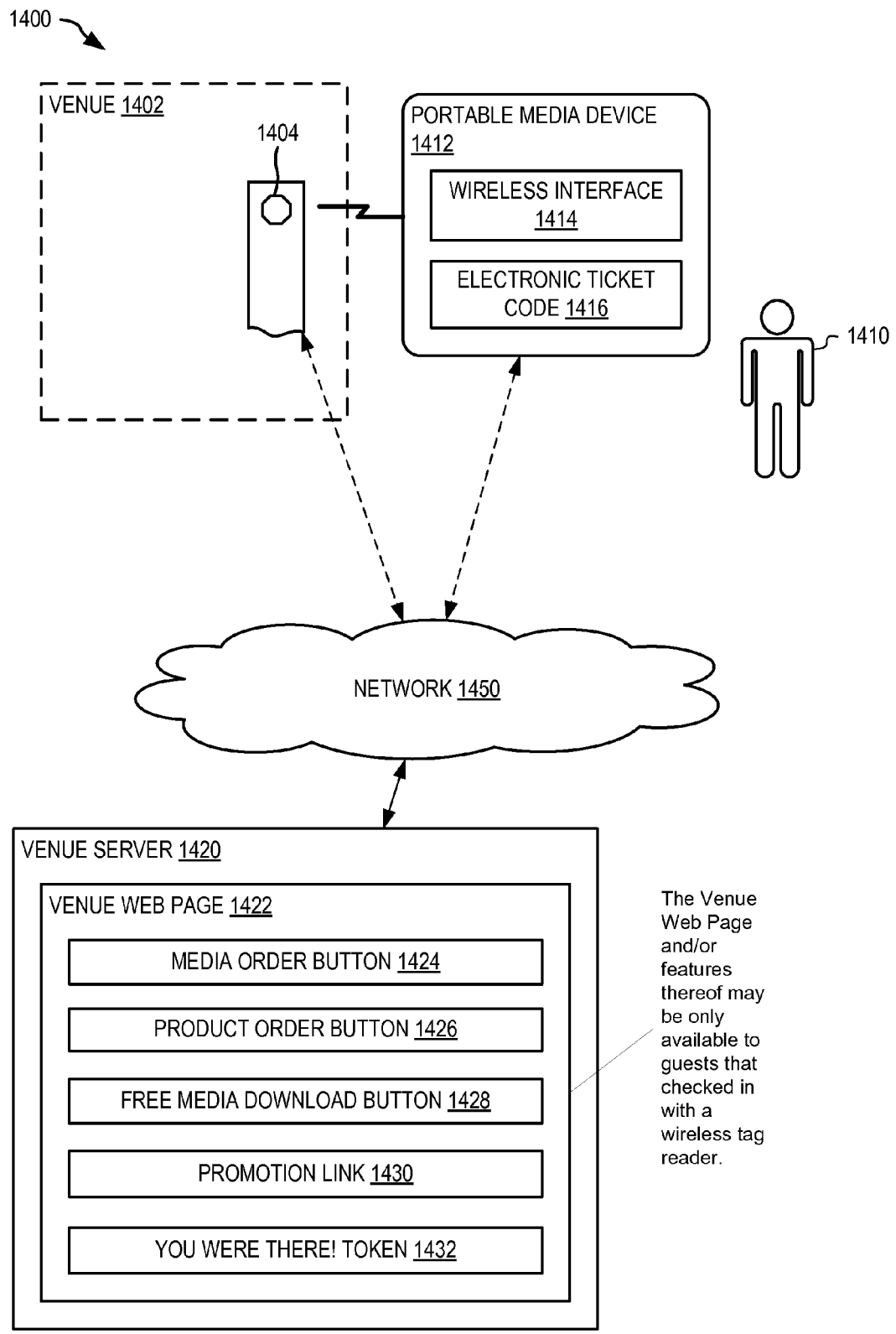
FIG. 14 shows one exemplary system for automatically directing a portable communication device to a venue page that is available only to guests at a venue, in an embodiment.

FIG. 14 shows one exemplary system 1400 for automatically directing a portable communication device 1412 to connect, via a network 1450, to a venue web page 1422 that is available only to guests located at a venue 1402, and particularly where the guest has that have checked in using their portable media device 1412 and an electronic ticket 1416 at a venue wireless reader 1404.

For example, venue web page 1422 may contain buttons 1424, 1426 that allow guest 1410 to purchase (e.g., for shipment or download) media and products related to venue 1402 (or a band playing at the venue, for example), or may allows guest 1410 to download free media while at venue 1402. Venue web page 1422 may not be accessible to people not at venue 1402, for example.

In one embodiment, venue web page 1422 contains free media download button 1428 that, when clicked by guest 1410, automatically downloads a media file onto portable media device 1412. In another embodiment, venue web page 1422 contains a media order button 1428 that, when clicked by guest 1410, automatically takes a payment from device 1412 and downloads the associated media to device 1412. In another embodiment, venue web page 1422 contains a product order button 1426 that, when clicked on by guest 1410, places an order for an associated product.

Specifically, venue server 1420 may offer media and products, or different prices (e.g., discounted) to guests attending venue 1402 that are not available to people not attending venue 1402. In another embodiment, venue web page 1422 displays a promotion link 1430 specific to the time and place of venue 1402 that when selected by guest 1410 redirects a browser of device 1412 to additional offers and information that is not available to people outside of venue 1402.

In one embodiment, a wireless tag (e.g., tag 1100 of FIG. 11) contains music samples of newly released (or about to be released) songs, trailers for movies, trailers for TV shows, and so on, wherein a user may download the music, trailers, etc, to a portable media device directly from the wireless tag or via a web site identified by the wireless tag.

In another example, where a portable media device (e.g., a mobile phone) includes wireless capability (e.g., NFC capability, or other wireless technology such as Bluetooth 4.0), the portable media device may be loaded with an e-ticket that is validated by a wireless reader upon entrance of the device to a venue. As the user enters, the device may be directed, by the wireless reader at the entrance, to a web site that sells media of an artist playing at the venue. Alternatively, the device may be loaded with one or more of a coupon, promotional material, a free song, free images, and so on.

In yet another example, where a guest's portable media device includes wireless capability and accesses a web page through a URL provided by a wireless tag at a venue, the portable media device may be registered as having been present at the venue at a given date and time. Registry of the portable media device may be established by the web page downloading a digital coupon to the portable media device, or by the web page receiving information of the guest or the portable media device, and storing the information in a database. Thereafter, the portable media device and/or the guest may be deemed eligible for special merchandise offers, media downloads, loyalty programs or social media participation based on the guest's presence at the venue at the specific date and/or time. This feature may be thought of as enabling a "You Were There!" functionality wherein even after the event, the guest remains eligible for the special offers, participation or downloads. You Were There! functionality may be particularly useful for enabling offers that may not be in existence at the time that a guest attended, but could be created later because something unexpected or noteworthy happened at that date or time. For example:

A concert could become noteworthy, perhaps because there was an unexpected appearance by an additional artist, because it became famous as a breakthrough performance by a rising artist, or because it became an artist's last performance. A guest at that concert could receive future offers to obtain audio or video recordings or other commemoration merchandise related to the concert, or could be deemed eligible to participate in social media as one known to have been at the concert.

A guest at an outdoor venue could receive a future offer of merchandise or discounted or free tickets, as compensation for the venue experiencing poor weather or some other adverse natural event.

A guest at an indoor venue could receive a future offer of merchandise or discounted or free tickets, as compensation for the venue experiencing security issues or a power outage.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween. In particular, the following embodiments are specifically contemplated, as well as any combinations of such embodiments that are compatible with one another:

A. A system for delivering information to a guest at a venue, including a wireless tag, located within the venue and having a Universal Resource Locator (URL) stored therein; and a server for providing a web page addressable by the URL and containing the information; such that the web page displays the information to any portable media device, used by the guest, that interfaces with the wireless tag.

B. The system of embodiment A, wherein the wireless tag is an NFC tag.

C. The system of embodiments A or B, wherein the wireless tag is attached to a mobility device within the venue.

D. The system of any of embodiments A through C, wherein the mobility device is a chair of a chairlift.

E. The system of any of embodiments A through D, wherein the wireless tag is integrated with a ski area map display attached to the chairlift.

F. The system of any of embodiments A through C, wherein the mobility device is a cabin of a gondola.

G. The system of any of embodiments A through C, wherein the information includes one or more of audio, video, graphic and text presentation of safety information associated with use of the mobility device.

H. The system of any of embodiments A through G, wherein the server communicates with an advertisement database storing an advertisement, and wherein the advertisement is included within the web page and is delivered to the guest.

I. The system of any of embodiments A through H, the information comprising survey information, and wherein the web page provides the survey information to the guest and uploads responses of the guest to the server.

J. The system of any of embodiments A through I, wherein the web page addressable by the URL includes an advertisement.
K. The system of any of embodiments A through J, wherein the web page includes a coupon that can be stored on the portable media device and can be used within the venue.
L. The system of any of embodiments A through K, wherein the web page contains an announcement of a competition, and links to (a) terms of the competition, and (b) a feature indicating agreement to the terms, and wherein if the guest activates the feature indicating agreement to the terms, the portable media device is redirected to a competition web page that contains information of the competition.
M. The system of any of embodiments A through L, wherein upon the guest agreeing to the terms, the web page retrieves information of the guest from the portable media device and provides the information to a third party
N. The system of any of embodiments A through M, wherein the web page contains an announcement of a survey and a link to a survey web page, wherein if the guest follows the link, the portable media device is redirected to the survey web page.
O. The system of any of embodiments A through N, wherein the web page contains a selectable link to a social networking web page, wherein the portable media device of the guest receives the URL from the wireless tag and automatically connects to the web page to display the selectable link, and wherein, upon selection of the selectable link by the guest, the server sends information of the selectable link to the social networking server.
P. The system of any of embodiments A through O, wherein the selectable link initiates a "like" of the guest for an advertisement located proximate the wireless tag.
Q. The system of any of embodiments A through P, further comprising a location identifier within the wireless tag that identifies a location defined by the social networking server, wherein the selectable link initiates a "check-in" of the guest at the location.
R. The system of any of embodiments A through Q, wherein the web page invokes an upload script for uploading a photograph from the portable media device of the guest.
S. A system for delivering location specific information of a venue to a guest at the venue, comprising: a venue app that contains the information and is compatible with a portable media device of the guest; and a wireless tag located within the venue and having a location indicator that is associated with a location of the tag; wherein when the venue app resides on the portable media device and the portable media device receives the location indicator from the wireless tag, the portable media device displays the information, based upon the location indicator, utilizing the venue app.
T. The system of embodiment S, further comprising: a Universal Resource Locator (URL) stored within the wireless tag; and a server connected to the Internet for providing a web page addressable by the URL and containing updated information of the venue; wherein the server downloads the web page with the updated information to any portable media device that interfaces with the wireless tag.
U. The system of embodiments S or T, wherein the wireless tag is attached to one of a chair of a chairlift, and a cabin of a gondola.
V. A method for delivering information to a guest at a venue, comprising: configuring a web page with the information, wherein the web page is addressable by a Universal Resource Locator (URL) stored within a wireless tag; receiving an access request to the URL from a portable media device of the guest when the portable media device interfaces with the wireless tag; and delivering the information to the guest by sending the web page to the portable media device.
W. The method of embodiment V, further comprising retrieving the information from database running on a server to configure the web page.
X. A method for delivering contact information of an interested party to an advertiser, comprising: displaying an advertisement of the advertiser at a location accessible by the interested party and with a wireless tag programmed with a Universal Resource Locator (URL); configuring a web page addressable by the URL with a script for receiving the contact information; receiving an access request to the URL from a portable media device that interfaces with the wireless tag; receiving, using the script, the contact information from the portable media device; and sending the contact information to the advertiser in exchange for revenue.
Y. The method of embodiment X, further comprising placing the wireless tag on the advertisement in exchange for additional revenue.
Z. The method of embodiments X or Y, further comprising configuring the script to interact with the interested party via the portable media device to receive additional information.
AA. A system for delivering location specific information of a venue to a guest at the venue, comprising: a venue app, containing the location specific information, available for downloading to, and running on, a portable media device of the guest; and a wireless tag having a location indicator associated with a location of the tag; wherein if the portable media device runs the venue app and receives the location indicator from the tag, the venue app causes the portable media device to display the location specific information based upon the location indicator.
BB. A method for delivering information to a guest at a venue, comprising: configuring a web page that is addressable by a Universal Resource Locator (URL) stored within a wireless tag, with the information; receiving an access request to the URL from a portable media device that has read the URL from the tag; and sending the web page to the portable media device for delivery to the guest.
CC. A method for providing a venue with wireless tag based communication capability, comprising: configuring a plurality of wireless tags with digital content that is specific to the venue, wherein each of the wireless tags is capable of transmitting the digital content to a portable media device; and installing the wireless tags at the venue.
DD. The method of embodiment CC, wherein configuring comprises providing each of the wireless tags with a Universal Resource Locator (URL).
EE. The method of embodiments CC or DD, wherein providing each of the wireless tags with a URL comprises providing one or more of the URLs as an address of a web page that includes advertising content from an advertiser.

FF. The method of any of embodiments CC through EE, wherein installing the wireless tags at the venue comprises locating the one or more of the wireless tags with one or more printed advertisements from the advertiser.

GG. The method of any of embodiments CC through FF, wherein configuring comprises arranging for a wireless tag manufacturer or distributor to configure the wireless tags.

HH. The method of any of embodiments CC through GG, wherein installing comprises integrating each of the wireless tags with a component that is one of a seat, an armrest, a seat back and a map display, and installing the component at the venue.

II. The method of any of embodiments CC through HH, wherein configuring the plurality of wireless tags comprises configuring each of the plurality of wireless tags with digital content corresponding to a location identifier within the venue.

JJ. The method of any of embodiments CC through II, wherein configuring the plurality of wireless tags comprises configuring each wireless tag of a subset of the plurality of wireless tags with the same location identifier.

KK. The method of any of embodiments CC through II, wherein configuring the plurality of wireless tags comprises configuring each wireless tag of a subset of the plurality of wireless tags with a different location identifier.

LL. The method of any of embodiments CC through KK, wherein configuring each wireless tag comprises configuring each wireless tag with a location identifier that is specific to an individual carrier of a mobility device.

MM. The method of any of embodiments CC through LL, wherein configuring each wireless tag with a location identifier comprises configuring each wireless tag with a location identifier that is specific to an individual chair of a chairlift, and wherein installing comprises integrating each wireless tag with a media display system that includes a printed map of the ski area that includes the chairlift, and mounting the media display system on a restraint bar of the chair.

NN. A method for providing information services to guests of a venue that has wireless tags installed therein, comprising: configuring a server with information that corresponds to digital content stored on one or more of the wireless tags; and upon receiving a request from a portable media device that receives the digital content from one of the wireless tags, downloading the information to the portable media device.

OO. The method of embodiment NN, wherein configuring the server comprises configuring the information as a web page.

PP. The method of embodiment NN or OO, wherein configuring the server comprises configuring the information as one or more of video, audio, text and an image.

QQ. The method of any of embodiments NN through PP, wherein configuring the server comprises receiving at least part of the information from an operator of the venue.

RR. The method of any of embodiments NN through QQ, wherein configuring the server comprises configuring the information as a plurality of Universal Resource Locator (URL)s, and wherein downloading the information comprises responding with one of the URLs that corresponds to a location identifier contained within the request.

SS. The method of any of embodiments NN through RR, further comprising generating utilization information that includes at least one of requests received from one or more portable media devices, information downloaded to the portable media devices, and information uploaded from the portable media devices.

TT. The method of any of embodiments NN through SS, further comprising transferring the utilization information to an advertiser in exchange for revenue.

UU. A method for a venue operator to enhance customer experience of guests at a venue, comprising: providing information of the venue to a media provider; and granting the media provider access to the venue to install wireless tags with a physical display of the information within the venue, the wireless tags storing digital content that the guests can access through a portable media device to display further information.

VV. The method of embodiment UU, further comprising collecting revenue from the media provider in exchange for the access.

WW. The method of embodiments UU or VV, wherein granting the media provider access comprises allowing the media provider to install media display systems that integrate the information of the venue with the wireless tags.

XX. The method of any embodiments UU through WW, wherein providing the information of the venue comprises providing a map of the venue.

YY. The method of any embodiments UU through XX, wherein granting the media provider access to the venue comprises allowing the media provider to install media display systems that integrate the map of the venue with the wireless tags, on chairs of a chairlift.

ZZ. The method of any embodiments UU through YY, wherein providing the information of the venue comprises providing information about number and type of facilities at the venue, for use in determining a number of the wireless tags and configuring the wireless tags.

AAA. The method of any embodiments UU through ZZ, further comprising providing updated information of the venue to the media provider, to be provided to the guests as the further information.

What is claimed is:

1. A system for delivering information to a guest at a venue, the venue being a ski resort, comprising:
a wireless tag attached to one of a chair lift and a gondola located within the ski resort, the wireless tag being positioned at a ski map located on the chair lift or the gondola and having a Universal Resource Locator (URL) stored therein;
a venue server for hosting a web page addressable by the URL; and
a database coupled to the venue server and storing the information related to the venue, the information being accessible via the web page and comprising at least one of slope grooming information, ski lift openings and closures, ski lift wait times, terrain information, an advertisement, and a location identifier associated with the location of the wireless tag;
wherein the web page displaying the information to a portable media device, upon scanning of the wireless tag via a wireless reader within the portable media device, used by the guest, that interfaces with the wireless tag.

2. The system of claim 1, wherein the wireless tag is an NFC tag.

3. The system of claim 1, wherein the information includes one or more of audio, video, graphic and text presentation of safety information associated with use of the mobility device.

4. The system of claim 1, wherein the venue server communicates with an advertisement server coupled with an advertisement database storing the advertisement, and wherein the advertisement is included within the web page and is delivered to the guest at the portable media device.

5. The system of claim 4, wherein the venue server obtains guest information from the portable media device and transmits the guest information to the advertisement server, the guest information including information of the guest and/or the guest's portable media device.

6. The system of claim 1, the information comprising survey information, and wherein the web page provides the survey information to the guest via the portable media device and uploads responses of the guest to the venue server.

7. The system of claim 1, wherein the web page includes a coupon for storage on the portable media device and for use within the venue.

8. The system of claim 1, wherein the web page contains an announcement of a competition within the ski resort, and links to (a) terms of the competition, and (b) a feature indicating agreement to the terms, and wherein if the guest activates the feature indicating agreement to the terms, the portable media device is redirected to a competition web page that contains information of the competition.

9. The system of claim 8, wherein upon the guest agreeing to the terms, the web page retrieves information of the guest from the portable media device and transmits the information to a third party.

10. The system of claim 1, wherein the web page contains an announcement of a survey and a link to a survey web page, wherein if the guest follows the link, the portable media device is redirected to the survey web page.

11. The system of claim 1, wherein the web page contains a selectable link to a social networking web page, wherein the portable media device of the guest receives the URL from the wireless tag and automatically connects to the web page to display the selectable link, and wherein, upon selection of the selectable link by the guest, the server sends information of the selectable link to a social networking server that provides the social networking web page.

12. The system of claim 11, wherein the selectable link initiates a "like" of the guest for an advertisement located proximate the wireless tag.

13. The system of claim 11, wherein the location identifier within the wireless tag that identifies a location defined by the social networking server, wherein the selectable link initiates a "check-in" of the guest at the location.

14. The system of claim 1, wherein the web page invokes an upload script for uploading a photograph from the portable media device.

15. The system of claim 1, wherein the location identifier identifies the chair by ski lift and/or by chair.

16. A method for delivering information to a guest at a venue, the venue being a ski resort, comprising:
configuring a web page with the information, wherein the web page is addressable by a Universal Resource Locator (URL);
receiving an access request to the URL from a portable media device of the guest when a wireless reader within the portable media device interfaces with a wireless tag attached to one of a chair lift and a gondola located within the ski resort, the wireless tag being positioned at a ski map located on the chair lift or gondola; and
delivering the information to the guest by sending the web page to the portable media device;
wherein the information corresponds to the location of the wireless tag within the venue.

17. The method of claim 16, further comprising retrieving the information from database running on a venue server to configure the web page.

18. A method for delivering information to a guest at a venue, the venue being a ski resort, comprising:
configuring a web page, addressable by a Universal Resource Locator (URL), with the information;
receiving an access request to the URL from a portable media device upon a wireless reader within the portable media device reading the URL from a wireless tag attached to one of a chair lift and a gondola located within the ski resort, the wireless tag being positioned at a ski map attached to the chair lift or gondola; and
sending the web page to the portable media device for delivery to the guest;
wherein the information corresponds to the location of the wireless tag within the ski resort.

* * * * *